US012592872B2

(12) United States Patent
Chlebus et al.

(10) Patent No.: US 12,592,872 B2
(45) Date of Patent: Mar. 31, 2026

(54) DETECTING AND VALIDATING ANOMALIES FROM ONGOING DATA COLLECTION

(71) Applicant: Qualtrics, LLC, Provo, UT (US)

(72) Inventors: Grzegorz Chlebus, Cracow (PL); Carol Sue Haney, Chicago, IL (US); Przemyslaw Franciszek Simajchel, Cracow (PL); Maksym Titov, Cracow (PL); Recep Colak, Seattle, WA (US); Kamil Surmacz, Cracow (PL); Dominik Franciszek Schaefer, Adliswil (CH); Szymon Wladyslaw Jachim, Cracow (PL)

(73) Assignee: Qualtrics, LLC, Provo, UT (US)

( * ) Notice: Subject to any disclaimer, the term of this patent is extended or adjusted under 35 U.S.C. 154(b) by 0 days.

(21) Appl. No.: 18/340,568

(22) Filed: Jun. 23, 2023

(65) Prior Publication Data

US 2024/0430181 A1 Dec. 26, 2024

(51) Int. Cl.
H04L 43/028 (2022.01)
H04L 43/04 (2022.01)
(52) U.S. Cl.
CPC ............ H04L 43/028 (2013.01); H04L 43/04 (2013.01)
(58) Field of Classification Search
CPC .............................. H04L 43/028; H04L 43/04
USPC ........................................................ 709/224
See application file for complete search history.

(56) References Cited

U.S. PATENT DOCUMENTS

| | | | |
|---|---|---|---|
| 2015/0269050 A1* | 9/2015 | Filimonov | G06Q 10/0639 702/183 |
| 2020/0021607 A1* | 1/2020 | Muddu | H04L 43/00 |
| 2020/0210393 A1* | 7/2020 | Beaver | G06F 16/2474 |
| 2020/0285997 A1* | 9/2020 | Bhattacharyya | G06N 7/00 |
| 2022/0342868 A1* | 10/2022 | Gonzalez Macias | G06F 7/08 |
| 2023/0259504 A1* | 8/2023 | Gonzalez Macias | G06F 16/285 707/690 |

OTHER PUBLICATIONS

"AWS CloudFormation User Guide, AWS::FMS::Policy." webpage <https://docs.aws.amazon.com/AWSCloudFormation/latest/UserGuide/aws-resource-fms-policy.html>, 2023, 10 pages, retrieved on Oct. 23, 2023.
"How Hyperparameter Tuning Works—Amazon SageMaker" webpage <https://docs.aws.amazon.com/sagemaker/latest/dg/automatic-model-tuning-how-it-works.html>, Amazon Web Services, Inc. pp. 1-2. 2023.

(Continued)

*Primary Examiner* — Tan Doan
(74) *Attorney, Agent, or Firm* — Keller Preece PLLC

(57) ABSTRACT

The present disclosure relates to systems, non-transitory computer-readable media, and methods for detecting and validating anomalies from an ongoing data collection by applying an algorithm corresponding to a data pattern of the ongoing data collection. In particular, in one or more embodiments, the disclosed systems utilize a time series classification model to identify a data pattern corresponding to the ongoing data collection. Further, the disclosed systems can utilize an algorithm corresponding to the data pattern to monitor the ongoing data collection for anomaly candidates. Additionally, in one or more embodiments, the disclosed systems pass anomaly candidates through an anomaly validation filter to remove false positives.

17 Claims, 11 Drawing Sheets

100

(56)                    References Cited

OTHER PUBLICATIONS

"Jenkins: Build Great Things at Any Scale", Webpage <https://www.jenkins.io/>, 3 pages, retrieved from internet Oct. 11, 2023.

"KerasTuner Oracles." webpage <https://keras-team.github.io/keras-tuner/documentation/oracles/> Google Apache, Version 2.0. pp. 1. 2019.

"Random Forest Regressor." Webpage <https://scikit-learn.org/stable/modules/generated/sklearn.ensemble.RandomForestRegressor.html#sklearn.ensemble.RandomForestRegressor.feature_importances_> Sckit-learn Developers. pp. 1-8. 2007.

"Scipy.stats.weightedtau" Webpage <https://docs.scipy.org/doc/scipy/reference/generated/scipy.stats.weightedtau.html> SciPy v1.11.2 Manual. pp. 1-3. 2008.

"Shapley Value." Wikipedia Free Encyclopedia. Webpage <https://en.wikipedia.org/wiki/Shapley_value> Wikimedia Foundation, Inc. pp. 1-5. Jul. 23, 2023.

"Symmetric Mean Absolute Percentage Error." Wikipedia The Free Encyclopedia. Webpage <https://en.wikipedia.org/wiki/Symmetric_mean_absolute_percentage_error> pp. 1. Sep. 9, 2009.

"What is Amazon DynamoDB?" Introduction to Amazon DynamoDB Developer Guide. <https://docs.aws.amazon.com/amazondynamodb/latest/developerguide/Introduction.html> pp. 1. API Version Aug. 10, 2010.

"What is Amazon SageMaker?" Webpage <https://docs.aws.amazon.com/sagemaker/latest/dg/whatis.html>, Amazon Web Service. pp. 1. 2023.

"What is ETL (Extract Transform Load)". Webpage <https://aws.amazon.com/what-is/etl/#:~:text=Extract%2C%20transform%2C%20and%20load%20(,and%20machine%20learning%20(ML). Amazon Web Services. pp. 1-5. 2023.

Jeff Johnson. "A heuristic method for estimating the relative weight of predictor variables in multiple regression." Multivariate Behavioral Research 35.1. pp. 1-19. Jan. 2000.

Jenkins, "Pipline: Build Step". Webpage <https://www.jenkins.io/doc/pipeline/steps/pipeline-build-step/>, 2 pages, retrieved Oct. 23, 2023.

* cited by examiner

502

506

504

500

900

902
Categorizing A Data Pattern For An Ongoing Data Collection

904
Monitoring The Ongoing Data Collection Based On An Algorithm Corresponding To The Data Pattern 906
Identifying An Anomaly Candidate 908
Validating The Anomaly Candidate 910
Providing An Anomaly Notification

1100

DETECTING AND VALIDATING ANOMALIES FROM ONGOING DATA COLLECTION

BACKGROUND

Recent years have seen significant development in systems that improve the accuracy of identifying trends and changes by monitoring digital metrics recorded across time. For example, conventional analytics computing systems can identify and present anomalies representing user actions with respect to websites, network applications, or other network-based device operations. To illustrate, some existing systems can monitor series to identify metrics outside of an expected trend.

Although conventional analytics computing systems can identify anomalies in digital metrics, such systems often inaccurately and inefficiently identify anomalous values within digital metrics by applying conventional anomaly detection algorithms. For instance, conventional systems can inaccurately identify anomalies for more complex data patterns in digital metrics, such as when the data metrics follow seasonal patterns or when the data metrics are driven by events. Specifically, many conventional analytics computing systems uniformly apply a conventional anomaly detection algorithm to a variety of data streams with a variety of data patterns. For example, many conventional analytics computing systems utilize a rules-based algorithm. This one-size-fits-all approach causes many conventional analytics computing systems to inaccurately identify anomalies in the data streams. That is, conventional analytics computing systems frequently generate false positives for anomaly detection and frequently miss genuine anomalies.

By applying conventional anomaly detection algorithms that lead to inaccurate detection of anomalies, conventional analytics computing systems inefficiently utilize computing resources. For example, conventional systems often require excessive time and computing resources to tune their algorithms to reach acceptable performance. Additionally, as mentioned, conventional analytics computing systems generally analyze various data streams utilizing a uniform conventional anomaly detection algorithm. The false positives generated by this approach cause excess utilization of computing time and resources. This inefficiency is compounded in many conventional analytics computing systems when false positive anomalies are presented to one or more client devices.

Additionally, some conventional analytics computing systems rigidly apply conventional anomaly detection algorithms. For example, as just mentioned, some conventional systems apply conventional anomaly detection algorithms to a data stream regardless of variation for the type or value of underlying data in the time series. By ignoring variations in data type or value, some conventional systems can misidentify different seasonal variations, event-driven variations, or data patterns that combine multiple factors as including anomalous values. This rigid approach is inapplicable to a large portion of data streams with various data patterns, and thus lacks flexibility to accurately detect anomalies in a wide variety of circumstances.

These along with additional problems and issues exist with regard to conventional systems.

BRIEF SUMMARY

Embodiments of the present disclosure provide benefits and/or solve one or more of the foregoing or other problems in the art with systems, non-transitory computer-readable media, and methods for finding and categorizing a data pattern for an ongoing data collection, utilizing an algorithm corresponding to the categorized data pattern to identify anomaly candidates in the ongoing data collection, and validating the anomaly candidate utilizing an anomaly filter. More specifically, in one or more embodiments, the disclosed systems utilize a data classification model to categorize a data pattern for the ongoing data collection. Thus, the disclosed systems can utilize an algorithm corresponding to the identified data pattern to monitor the ongoing data collection. Additionally, in some embodiments, the disclosed systems validate the applied algorithm and the anomaly candidate utilizing one or more sensitivity and/or fit thresholds. Further, in one or more embodiments, the disclosed systems also provide an anomaly notification to a client device via a data report graphical user interface.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 7:
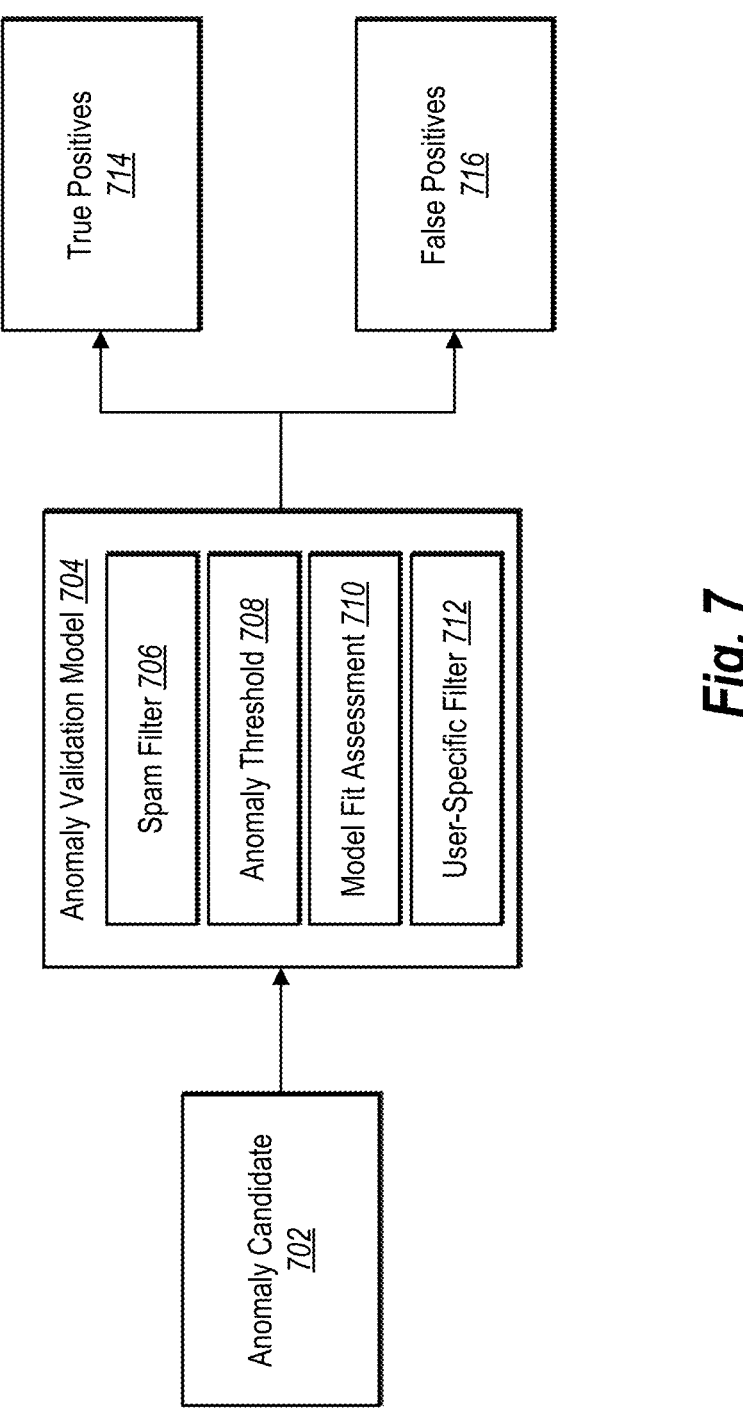
FIG. 7 illustrates an example anomaly validation model in accordance with one or more embodiments.

This disclosure describes one or more embodiments of an anomaly detection system that detects anomalies in ongoing data collection by determining data patterns utilizing time series classifications, detecting anomaly candidates utilizing algorithms corresponding to the data patterns, and validating the anomaly candidates utilizing an anomaly filter that utilizes predefined filtering rules to eliminate a subset of detected anomaly candidates, as described further with regard to FIG. 7. More specifically, in one or more embodiments, the anomaly detection system categorizes an ongoing data collection into a data pattern utilizing a time series classification model. In some embodiments, the anomaly detection system selects an algorithm corresponding to the data pattern. Thus, in one or more embodiments, the anomaly detection system can utilize an algorithm corresponding to the data pattern to detect anomalies in real-time or near-real-time from the ongoing data collection. Further, in one or more embodiments, the anomaly detection system utilizes an anomaly validation filter to remove false positives and to implement user settings for detected anomalies.

As mentioned, in one or more embodiments, the anomaly detection system utilizes a time series classification model to identify a time series classification corresponding to an ongoing data collection. To illustrate, in one or more embodiments, the anomaly detection system utilizes a time series classification model to identify features of the ongoing data collection. Further, the time series classification model can leverage the identified features to classify the ongoing data collection into one or more of a set of predefined data patterns.

Additionally, in some embodiments, the anomaly detection system utilizes the data pattern for the ongoing data collection to identify anomaly candidates within the ongoing data collection. More specifically, in one or more embodiments, the anomaly detection system monitors the ongoing data collection in real-time and utilizes a time series model to evaluate the ongoing data collection relative to the data pattern for the ongoing data collection. In some embodiments, the time series model includes an algorithm corresponding to the data pattern that evaluates the most recent data point of an ongoing data collection to the determined data pattern. Additionally, in one or more embodiments, the time series model includes a Gaussian process regression model including one or more kernel functions. Additionally, in one or more embodiments, the time series model includes data pattern algorithms that correspond to a data pattern for an ongoing data collection. The anomaly detection system can utilize these algorithms in the time series model to determine anomaly candidates.

In some embodiments, the anomaly detection system fits and tunes the algorithms corresponding to the data patterns by determining kernel parameters corresponding to each data pattern. Further, in some embodiments, the anomaly detection system tunes hyperparameters for the algorithms corresponding to data patterns. Thus, in one or more embodiments, the anomaly detection system can generate tuned algorithms corresponding to various data patterns. In some embodiments, the algorithms are Gaussian models corresponding to data patterns, as will be described further below.

Additionally, in one or more embodiments, the anomaly detection system can pass an anomaly candidate through an anomaly validation model to determine true positive anomaly candidates and false positive anomaly candidates. In one or more embodiments, the anomaly validation model applies thresholds for the deviation of the anomaly candidate and/or the fit of the data pattern to the ongoing data collection. Further, in some embodiments, the anomaly detection system utilizes the anomaly validation model to apply notification filters, including user-specific filters for presentation of various types of anomaly notifications.

In one or more embodiments, the anomaly validation model determines that an anomaly candidate is a true positive by determining that it is a statistically significant anomaly. Further, upon determining that an anomaly candidate is a true positive via the anomaly validation model, the anomaly detection system generates and provides an anomaly notification to a client device. In one or more embodiments, the anomaly notification includes information about the ongoing data collection and about the anomaly itself. Further, in some embodiments, the anomaly detection system generates the anomaly notification to include selectable options for feedback regarding the notification. Accordingly, the anomaly detection system can receive feedback for an anomaly notification.

In one or more embodiments, the anomaly detection system can utilize feedback to improve various parameters within the anomaly detection system. More specifically, in one or more embodiments, the anomaly detection system collects feedback via an anomaly notification. Based on the feedback, the anomaly detection system can modify and tune parameters of the time series classification model, the time series model, and/or the anomaly validation model in response to receiving feedback from a client device.

The anomaly detection system provides many advantages and benefits over conventional systems and methods. For example, by utilizing a time series classification model to determine a data pattern corresponding to an ongoing data collection the anomaly detection system improves accuracy relative to conventional systems. Specifically, the system can utilize a time series model or another algorithm corresponding to the data pattern to detect anomaly candidates for the ongoing data collection. Thus, the anomaly detection system detects anomaly candidates by accounting for the existing data pattern for the ongoing data collection and utilizing an algorithm custom-fit to the ongoing data collection. By customizing the algorithm for detecting anomaly candidates, the anomaly detection system improves accuracy of determined anomaly candidates over conventional systems.

Additionally, the anomaly detection system improves accuracy over conventional systems by utilizing an anomaly validation model to filter anomaly candidates. To illustrate, in one or more embodiments, the anomaly detection system implements a notification filter, an anomaly threshold, and/or a model fit assessment to each anomaly candidate. Accordingly, the anomaly detection system can remove any false positives from the anomaly candidates to improve the accuracy of determined anomalies in an ongoing data collection.

The anomaly detection system also improves efficiency relative to conventional systems by eliminating false positives experienced by conventional systems. As just mentioned, the anomaly detection system reduces or eliminates false positives by utilizing an algorithm corresponding to an identified data pattern for an ongoing data collection. Accordingly, the anomaly detection system reduces or eliminates excess utilization of computing time and resources caused by false positives, including in providing indications of false positive anomalies to client devices.

Additionally, the anomaly detection system improves flexibility relative to conventional systems utilizing algorithms for a wide variety of data patterns. This allows the anomaly detection system to detect anomalies in data patterns that many conventional systems cannot parse. Accordingly, the anomaly detection system is applicable to a much broader set of instances of ongoing data collection than conventional systems.

As illustrated by the foregoing discussion, the present disclosure utilizes a variety of terms to describe features and advantages of the anomaly detection system. Additional detail is now provided regarding the meaning of such terms. For example, as used herein, the term "time series classification model" refers to an algorithm for classifying time series. In particular, the term "time series classification model" can include a machine learning model for classifying ongoing data collection (or other data collections) into a data pattern. To illustrate, a time series classification model can include a long short term memory neural network, a recurrent neural network, or a variety of algorithms that can classify data collections into data patterns.

Additionally, as used herein, the term "ongoing data collection" refers to a set of data indexed in real-time. In one or more embodiments, an ongoing data collection includes data representative of users, user responses, and/or user actions relative to a particular application or website occurring at various times during a particular time period. To illustrate, an ongoing data collection can include incoming survey responses, hyperlink clicks, traffic data, search terms, and a variety of other user interactions.

Relatedly, as used herein, the term "data signal" refers to one or more related data points in an ongoing data collection. In particular, the term "data signal" can include a type of data or a single data point in an ongoing data collection. To illustrate, a data signal can include responses to a particular survey question in a survey data collection, traffic to a particular web page on a website data collection, or another set of related data points within a larger set of data.

Additionally, as used herein, the term "data pattern" refers to a configuration of data within a data set. In particular, the term "data pattern" can include a time series classification of an ongoing data collection. To illustrate, a data pattern for a data collection can include an upward or downward trend, periodic, noise, sparse, a combination thereof, or a variety of other data configurations over time.

Also, as used herein, the term "anomaly candidate" refers to an outlier or group of outliers in a dataset. For example, an anomalous data value can be a data value that abnormally differs from an expected value for a given time. To illustrate, an anomalous data value may represent an outlier data value in a metrics time series that has a statistically significant difference from the expected value. In one or more embodiments, the anomaly detection system identifies anomaly candidates utilizing a time series model including an algorithm corresponding to a data pattern for the ongoing data collection. Relatedly, as used herein, the term "anomaly" refers to an anomaly candidate that has been validated via an anomaly validation model and/or an anomaly filter.

Additionally, as used herein, the term "anomaly filter" refers to a model with one or more processes for validating an anomaly candidate. In particular, the term "anomaly filter" can include a model including user settings and system thresholds. To illustrate, an anomaly filter can include a spam filter, user-specific filters, anomaly thresholds, and/or a model fit assessment or threshold. In some embodiments, an anomaly filter is multi-variate and derived by a Cartesian product of multiple values utilized by the filter.

Further, as used herein, the term "anomaly notification" refers to a notice of an anomaly in an ongoing data collection. In particular, the term "anomaly notification" can include a digital message including information about an anomaly. To illustrate, an anomaly notification can include a digital message in a data report graphical user interface including information about the anomaly and/or the corresponding ongoing data collection.

Also, as used herein, the term "Gaussian process regression" refers to an algorithm that infers a probability distribution over all possible values. In particular, the term "Gaussian process regression" can include a probabilistic machine learning algorithm utilized for regression and/or classification. To illustrate, a Gaussian process regression can include one or more kernel functions based on training data. Relatedly, as used herein, the term "kernel function" refers to a function for transforming input data and transforming it into another form, including a form for further processing the data.

Figure 1:
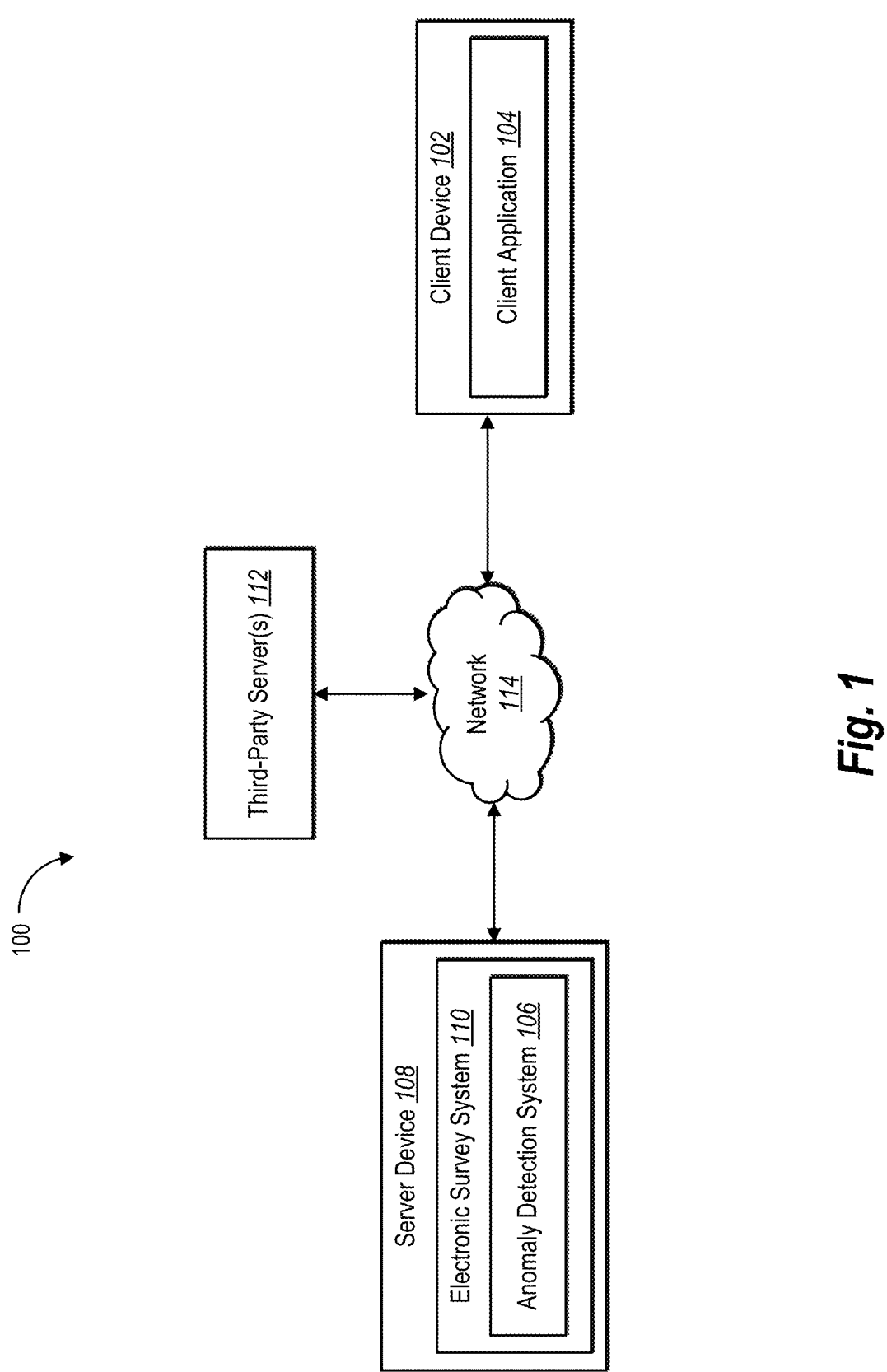
FIG. 1 illustrates a diagram of an environment in which an anomaly detection system can operate in accordance with one or more embodiments.

Additional features and characteristics of one or more embodiments of the system are described below with respect to the Figures. For example, FIG. 1 illustrates a block diagram of an example embodiment of a system 100. In general, and as illustrated in FIG. 1, the system 100 includes a client device 102 including a client application 104. The client device 102 communicates with server device(s) 108, including an electronic survey system 110 and an anomaly detection system 106, over a network 114. Further, the system 100 includes third-party server(s) 112 that may also communicate with the client device 102 and/or the server device(s) 108 via the network 114.

As will be described in greater detail below, the client device 102 can perform or provide the various functions, features, processes, methods, and systems as described herein. Additionally, or alternatively, the server device(s) 108 can perform or provide the various functions, features, processes, methods and systems as described herein. In one or more embodiments, the client device 102 and server device(s) 108 coordinate together to perform or provide the various functions, features, processes, methods, and systems, as described in more detail below.

Generally, the client device 102 can include any one of various types of client devices. For example, the client device 102 can be a mobile device (e.g., a smart phone), tablet, laptop computer, desktop computer, or any other type of computing device as further explained below with reference to FIG. 10. Additionally, the client application 104 can include any one of various types of client applications. For example, the client application 104 can be a web browser, and a user at the client device 102 may enter a Uniform Resource Locator (URL) or other address directing the web browser to access the anomaly detection system 106 and/or the electronic survey system 110 on the server device(s) 108. Alternatively, the client application can be a native application installed and executed on the client device 102.

Additionally, the server device(s) 108 can include one or more computing devices including those explained below with reference to FIG. 10. The client device 102, server device(s) 108, and network 114 may communicate using any communication platforms and technologies suitable for transporting data and/or communication signals, including any known communication technologies, devices, media, and protocols supportive of data communications, examples of which are described with reference to FIG. 10.

Although not a requirement, in one embodiment the anomaly detection system 106 can be part of the electronic survey system 110. Accordingly, as shown in FIG. 1, the server device(s) 108 hosts an electronic survey system 110, which includes the anomaly detection system 106. In one or more embodiments, the electronic survey system 110 collects survey responses and the anomaly detection system 106 receives and utilizes this survey data as an ongoing data collection. In other embodiments, the server device(s) 108 can include a system other than electronic survey system 110 for receiving or otherwise monitoring ongoing data collection. Additionally, the server device(s) 108 can receive ongoing data collection via the network 114 from the client device 102, the third-party server(s) 112, or from another source.

The third-party server(s) 112 can correspond to a variety of systems that track a variety of data, including that perform ongoing data collection. To illustrate, the third-party server(s) 112 can include servers for systems that track or manage sales data, calendar data, user or customer data, financial data, location data, and a variety of other system types. In one or more embodiments, the third-party server(s) provide data to the server device(s) 108 and the anomaly detection system 106 via the network 114.

Figure 2:
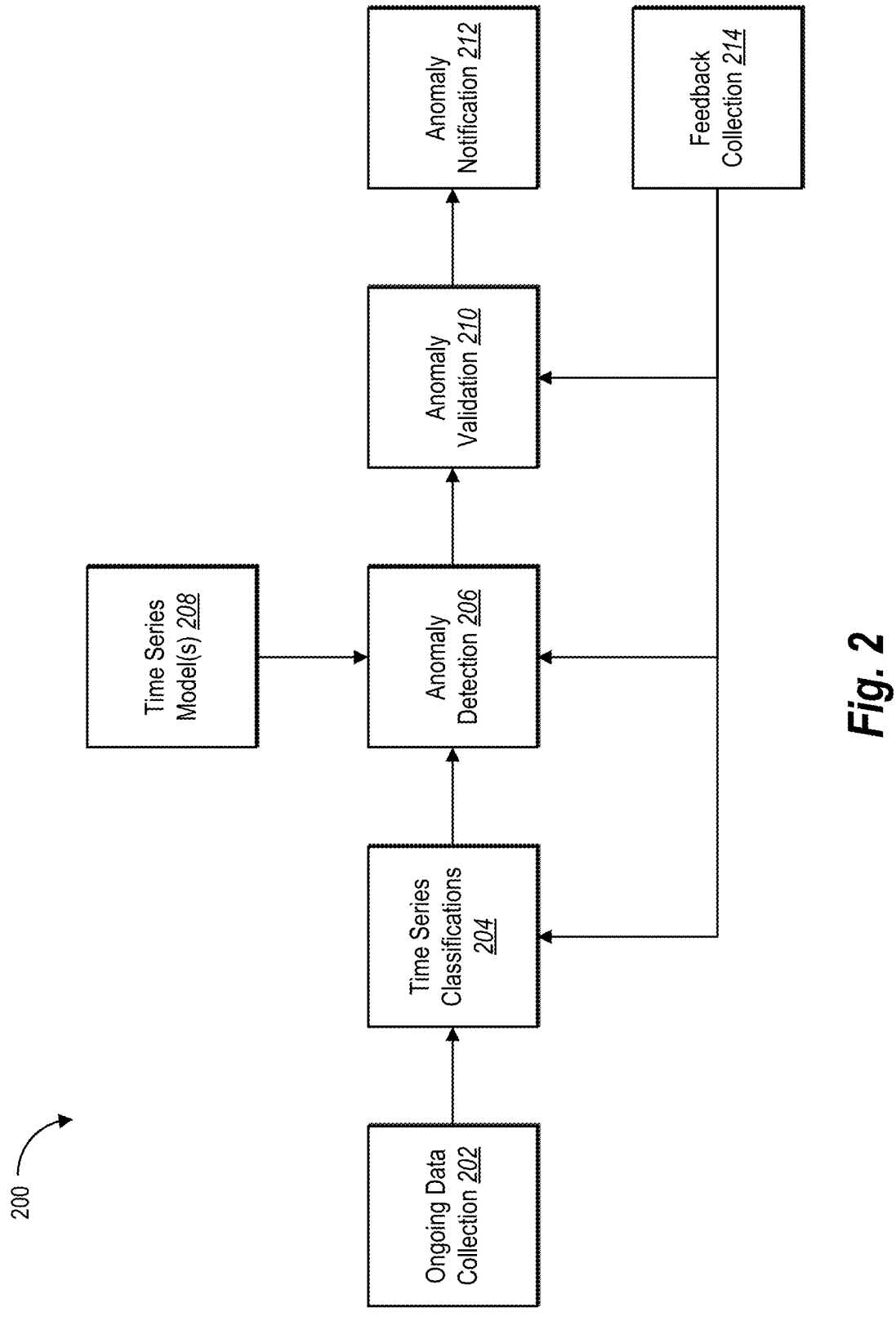
FIG. 2 illustrates an overview of a process for detecting and validating anomalies in an ongoing data collection in accordance with one or more embodiments.

The anomaly detection system 106 generates anomaly notifications by detecting and validating anomalies in an ongoing data collection. FIG. 2 illustrates an overview of a process 200 for identifying and validating anomalies to generate anomaly notifications. FIG. 2 also illustrates updating the anomaly detection system 106 based on user feedback.

In one or more embodiments, the anomaly detection system 106 determines data patterns corresponding to an ongoing data collection 202. As shown in FIG. 2, the data patterns can include time series classifications 204. More specifically, in one or more embodiments, the anomaly detection system 106 feeds the ongoing data collection 202 into a time series classification model to determine the time series classifications 204 for the ongoing data collection. In one or more embodiments, the time series classification model identifies features of the ongoing data collection and utilizes those features to determine the time series classifications 204.

Additionally, as shown in FIG. 2, the anomaly detection system 106 utilizes the time series classifications 204 to perform anomaly detection 206. More specifically, the anomaly detection system 106 can utilize the determined data patterns (e.g., the time series classifications 204) to identify anomaly candidates in the ongoing data collection. In some embodiments, the anomaly detection system 106 monitors the ongoing data collection 202 for deviation from expected trends corresponding to the time series classifications 204 in order to determine anomaly candidates from the ongoing data collection 202.

To illustrate, in one or more embodiments, the anomaly detection system 106 utilizes an algorithm corresponding to the determined time series classifications 204 to monitor the ongoing data collection 202. For example, as shown in FIG. 2, the anomaly detection system 106 can utilize time series model(s) 208 for the anomaly detection 206. In one or more embodiments, the anomaly detection system 106 determines and/or generates time series model(s) 208 corresponding to identified data patterns (e.g., the time series classifications 204). Additionally, in some embodiments, the time series model(s) 208 are Gaussian process regression models including on or more kernel functions corresponding to the identified data pattern. Accordingly, the anomaly detection system 106 can utilize the time series model(s) 208 to accurately monitor the ongoing data collection 202 for deviations from the determine data pattern to identify anomaly candidates.

As also shown in FIG. 2, the anomaly detection system 106 can perform anomaly validation 210 on anomaly candidates identified during anomaly detection 206. In one or more embodiments, the anomaly detection system 106 utilizes an anomaly validation model to filter anomaly candidates. More specifically, in some embodiments, the anomaly detection system 106 applies a threshold for deviation of the anomaly candidate from the determined data pattern corresponding to the ongoing data collection 202. In addition, or in the alternative, the anomaly detection system 106 can assess the quality of the fit of the determined data pattern to the ongoing data collection 202. Additionally, in one or more embodiments, the anomaly validation 210 includes one or more user-specific filters for notification or presentation of anomaly notifications.

Upon determining that an anomaly candidate passes successfully through the anomaly validation 210, the anomaly detection system 106 can determine that the anomaly candidate is an anomaly. Based on this determination, in one or more embodiments, the anomaly detection system 106 generates and presents the anomaly notification 212. To illustrate, in one or more embodiments, the anomaly detection system 106 generates an explanation of the anomaly in terms of type, timing, and ongoing data stream. Further, in one or more embodiments, the anomaly notification 212 includes one or more selectable options for user feedback on anomaly.

As shown in FIG. 2, the anomaly detection system 106 can perform feedback collection 214 based on user interaction with the anomaly notification 212 and other user interactions. In one or more embodiments, the anomaly detection system 106 utilizes the feedback to monitor the performance of the determination of the time series classifications 204, the performance of the anomaly detection 206, and the performance of the anomaly validation 210. More specifically, in one or more embodiments, the anomaly detection system 106 can utilize the feedback collection 214 to evaluate the performance of a time series classification model determining the time series classifications 204. In addition, or in the alternative, the anomaly detection system 106 can utilize the feedback collection 214 to evaluate the performance of the time series model(s) 208 and/or the anomaly validation 210. In one or more embodiments, the anomaly detection system 106 utilizes the performance evaluation based on the feedback collection 214 to modify parameters of the time series classification models, the time series model(s) 208, and/or the anomaly filter(s) used during the anomaly validation 210.

For example, the anomaly detection system 106 can determine a percentage of users that provide negative feedback to anomaly notifications identified by a time series model. In one or more embodiments, the anomaly detection system 106 compares the feedback percentage to a feedback threshold to determine whether and how to modify one or more parameters. In addition, or in the alternative, the anomaly detection system 106 identifies a downward trend in the feedback collection corresponding to a time series model indicating decreased accuracy of the model. Based on the decrease in positive feedback from the feedback collection 214 satisfying a threshold, the anomaly detection system 106 can determine to modify the sensitivity of the corresponding time series model.

In one or more embodiments, the anomaly detection system 106 determines the parameterization of algorithms corresponding to data patterns of ongoing data collection (e.g., time series models), as will be discussed in greater detail below with regard to FIG. 6. The anomaly detection system 106 can also adjust kernel parameters of algorithms based on the feedback collection 214. For example, in response to determining that notifications corresponding to an algorithm have decreasing positive feedback, the anomaly detection system 106 can modify the parameters of the algorithm to reduce the sensitivity of the algorithm.

Additionally, in one or more embodiments, the anomaly detection system 106 determines an anomaly ratio reflecting the performance of a time series model. To illustrate, the anomaly detection system 106 can determine a number of anomalies detected divided by the total number of signals from the ongoing data collection 202 that the time series model analyzed. In one or more embodiments, the anomaly detection system 106 compares the anomaly ratio to an expected anomaly ratio to determine whether and how to adjust algorithm parameters.

In some embodiments, the anomaly detection system 106 evaluates the feedback collection 214 in real-time. In addition, or in the alternative, the anomaly detection system 106 can evaluate the feedback collection 214 at designated intervals. To illustrate, the anomaly detection system 106 can evaluate the feedback collection 214 once a day, once a week, once a month, once every three months, etc.

Figure 3:
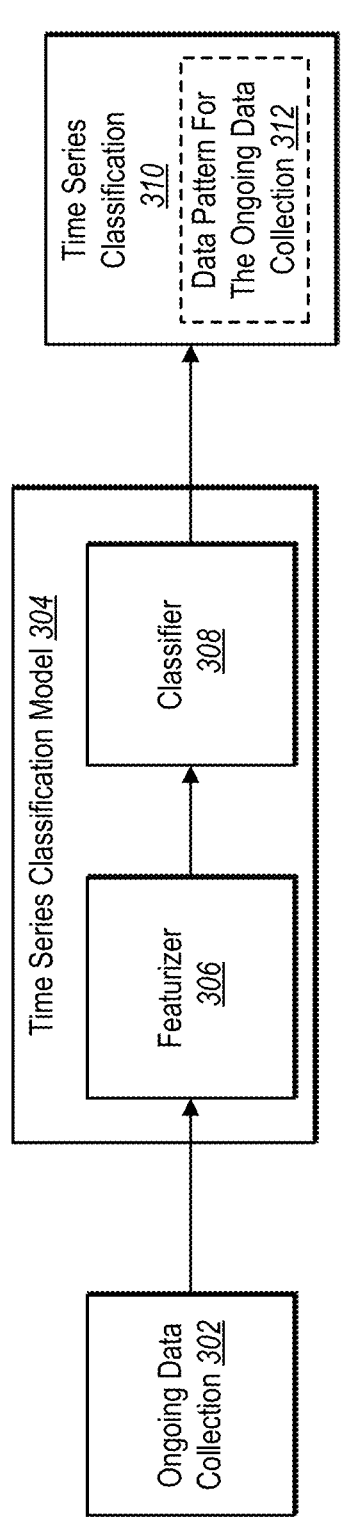
FIG. 3 illustrates an example time series classification model for identifying a time series classification for an ongoing data collection in accordance with one or more embodiments.

As mentioned above, in one or more embodiments, the anomaly detection system 106 utilizes a time series classification model to determine a data pattern for an ongoing data collection (e.g., a time series classification). FIG. 3 illustrates an example process 300 for utilizing a time series classification model to determine a time series classification for an ongoing data collection.

As shown in FIG. 3, the anomaly detection system 106 inputs an ongoing data collection 302 into a time series classification model 304. In one or more embodiments, the ongoing data collection 302 includes transactional data, operational data, survey data, or other data collected continuously or periodically. In some embodiments, the anomaly detection system 106 receives the ongoing data collection from a third-party system, a survey system, or a combination of the two.

In one or more embodiments, the anomaly detection system 106 trains the time series classification model 304. More specifically, the anomaly detection system 106 can utilize generated training samples including simulated data and/or training samples including collected and labelled test data. In one or more embodiments, the anomaly detection system 106 inputs the training samples into an untrained time series classification model. Thus, the untrained time series classification model can generate predicted time series classification(s) and/or predicted data patterns for training ongoing data collections associated with the training samples. Further, in one or more embodiments, the anomaly detection system 106 compares the predicted data patterns with ground-truth data patterns associated with the training data. In one or more embodiments, the anomaly detection system 106 can compare the ground-truth data patterns with the predicted data patterns utilizing a loss function. Thus, the anomaly detection system 106 can modify one or more parameters of the untrained time series classification model to minimize loss. Further, the anomaly detection system 106 can iteratively train the time series classification model to minimize loss.

As shown in FIG. 3, the time series classification model 304 includes a featurizer 306 and a classifier 308. In one or more embodiments, the featurizer 306 identifies features of an ongoing data collection. To illustrate, the anomaly detection system 106 can utilize the featurizer 306 to identify multivariate signals within the ongoing data collection 302. The anomaly detection system 106 can, accordingly, determine features of each signal within the ongoing data collection 302.

Accordingly, the anomaly detection system 106 can utilize the featurizer 306 to calculate hundreds of feature types of the ongoing data collection 302, including various values, coefficients, ratios, trends, standard deviations, profiles, averages, quantiles, reoccurrence, skewness, variance, lengths, entropies, and a variety of other features of data over time. In some embodiments, the featurizer 306 determines features for each signal within the ongoing data collection 302 and provides the features to the classifier 308.

In one or more embodiments, the anomaly detection system 106 can utilize the classifier 308 to determine a time series classification 310 for each signal within the ongoing data collection 302 based on the received features. In some embodiments, the classifier 308 is a machine learning model, including a decision tree machine learning model. More specifically, in one or more embodiments, the classifier 308 includes a gradient boosting decision tree algorithm. Accordingly, in some embodiments, the classifier 308 includes various decision trees to categorize the ongoing data collection 302 based on the received features. More specifically, in one or more embodiments, the classifier 308 determines the time series classification 310 based on predictions of a variety of decision trees included in the gradient boosting decision tree algorithm.

As shown in FIG. 3, the time series classification model 304 generates a time series classification 310. In one or more embodiments, the anomaly detection system 106 utilizes this time series classification as a data pattern for the ongoing data collection 312. The anomaly detection system 106 can utilize the time series classification model 304 to identify data patterns with both regular and irregular features.

To illustrate, an embodiment of the anomaly detection system 106 can utilize a comprehensive time series classification model that classifies a wide variety of available features or a streamlined time series classification model that classifies only the most relevant features. In one or more embodiments, the anomaly detection system 106 utilizes a streamlined time series classification model that classifies features having a threshold relative importance score (e.g., relative importance greater than 1%). The anomaly detection system 106 can utilize both or either of a comprehensive time series classification model and/or a streamlined time series classification model with great accuracy for both regular and irregular data patterns.

In some embodiments, the time series classification 310 can include classifications such as sparse, event-driven, regime change, periodic, periodic with trend, noise, or other time series classifications. Further, the anomaly detection system 106 can determine an algorithm associated with the data pattern for the ongoing data collection 312.

Figure 4:
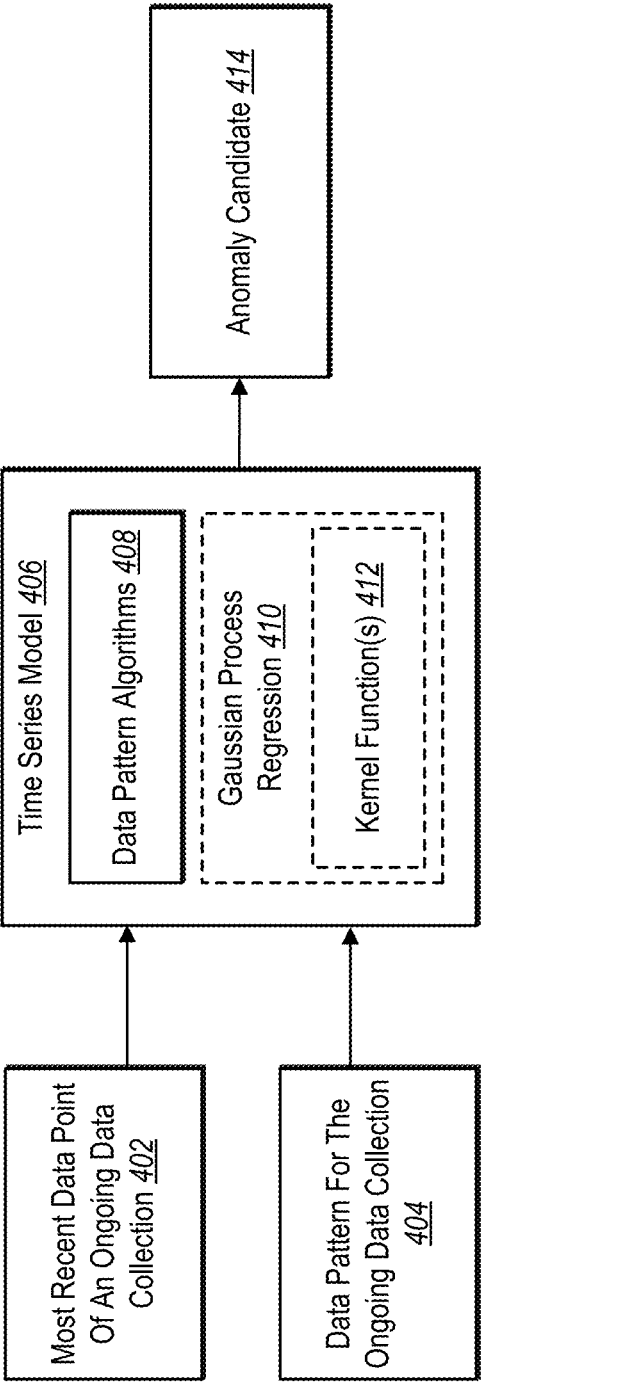
FIG. 4 illustrates an example time series model for identifying an anomaly candidate in accordance with one or more embodiments.

As mentioned above, in one or more embodiments, the anomaly detection system 106 can utilize the algorithm corresponding to data pattern for the ongoing data collection to identify anomaly candidates within the ongoing data collection. More specifically, in one or more embodiments, the anomaly detection system 106 feeds the ongoing data collection into a time series model corresponding to the data pattern. FIG. 4 illustrates an example process for utilizing a time series model corresponding to a data pattern for an ongoing data collection to monitor data points from an ongoing data collection and identify anomaly candidates.

As shown in FIG. 4, the anomaly detection system 106 inputs the most recent data point of an ongoing data collection into a time series model 406. More specifically, in one or more embodiments, the anomaly detection system 106 continuously provides the most recent data point of the ongoing data collection 402 to the time series model 406 in real-time. Accordingly, the time series model 406 can access each data point from the ongoing data collection sequentially and in real-time.

As also shown in FIG. 4, the anomaly detection system 106 can provide a data pattern for the ongoing data collection 404 to the time series model 406. For example, as discussed above with regard to FIG. 3, the anomaly detection system 106 can provide the time series model with a time series classification that a time series classification model identified for the ongoing data collection. In one or more embodiments, the time series model 406 utilizes the data pattern for the ongoing data collection 404 to analyze the data points from the ongoing data collection.

To illustrate, as shown in FIG. 4, the time series model 406 includes one or more data pattern algorithms. In one or more embodiments, the anomaly detection system 106 can select the data pattern algorithms 408 and/or the time series model 406 based on the data pattern for the ongoing data collection 404. To illustrate, the anomaly detection system 106 can select and utilize the time series model 406 or the data pattern algorithms 408 that corresponds to the data pattern for the ongoing data collection 404. Thus, by utilizing a time series model 406 corresponding to the data pattern, the anomaly detection system 106 can monitor the ongoing data collection in a context-aware way.

As also shown in FIG. 4, the time series model 406 can include a Gaussian process regression 410. To illustrate, by utilizing Gaussian processes, the anomaly detection system 106 can perform accurately in a small-data regime. Additionally, utilizing the Gaussian processes provides versatile and flexible algorithms by utilizing a variety of kernel definitions corresponding to various data patterns. Further, the Gaussian processes utilize probabilistic prediction (e.g., empirical confidence intervals), which allows flexible prediction by facilitating refitting.

Further, in one or more embodiments, the anomaly detection system 106 utilizes a Gaussian mixture model (GMM), including for irregular ongoing data collections. In one or more embodiments, the anomaly detection system 106 can utilize a GMM to track and predict multiple different data patterns within a single ongoing data collection, including within a single data stream of an ongoing data collection.

In one or more embodiments, the anomaly detection system 106 utilizes the Gaussian process regression 410 by implementing Gaussian processes in a regression to predict expected signals for a data pattern. Additionally, the anomaly detection system 106 can utilize the Gaussian process regression 410 to determine a variation range from the predicted expected signals for the data pattern based in part on a predicted noise level for the ongoing data collection. Accordingly, as will be discussed below with regard to FIG. 5, the anomaly detection system 106 can utilize the expected signals and the variation range to identify an anomaly candidate 414.

As shown in FIG. 4, and as briefly mentioned above, the Gaussian process regression 410 can include one or more kernel function(s) 412. As will be discussed below with regard to FIG. 6, the anomaly detection system 106 can apply kernel parameters for the Gaussian process regression by maximizing log marginal likelihood for a data pattern. Additionally, the anomaly detection system 106 can perform hyperparameter tuning for the kernel function(s) 412 utilizing Bayesian search. Further, in one or more embodiments, the Gaussian process regression includes a data-fit term, a complexity penalty, and a normalization constant.

In one or more embodiments, the anomaly detection system 106 utilizes the time series model 406 and/or the Gaussian process regression 410 to determine predicted expected signals for a variety of signals within an ongoing data collection. For example, the ongoing data collection can include one or more survey data collections. Accordingly, the ongoing data collection can include survey response rates, a balance of multiple choice responses particular survey questions, sentiment of free form survey responses, survey completion rates, and a variety of other types of survey data. Accordingly, the anomaly detection system 106 can determine expected signals and expected ranges for each signal within the ongoing data collection.

Figure 5:
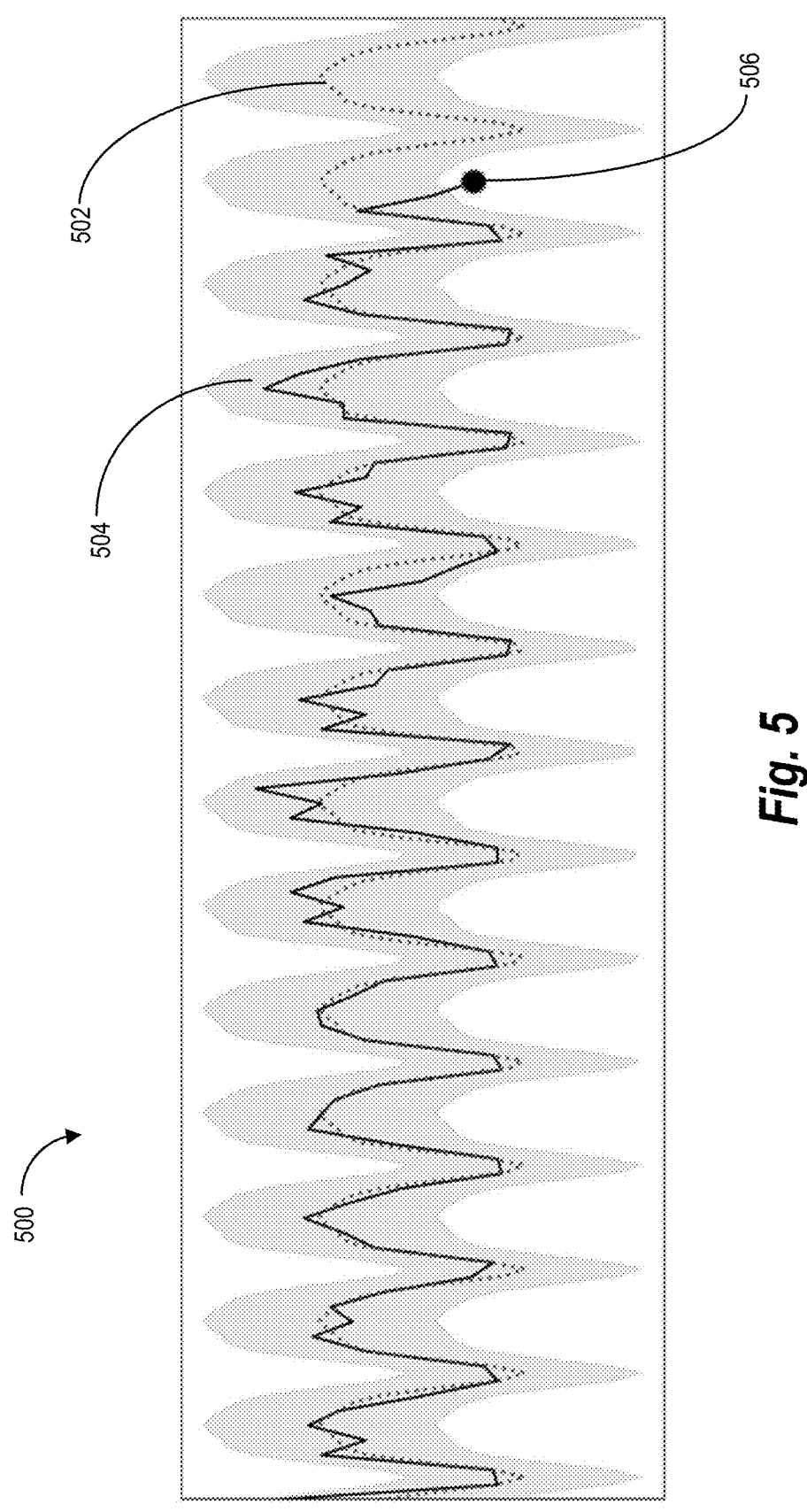
FIG. 5 illustrates an example graph showing an ongoing data collection, a corresponding data pattern, and a threshold deviation from the data pattern in accordance with one or more embodiments.

As mentioned above, the anomaly detection system 106 can utilize a time series model to monitor an ongoing data collection. FIG. 5 illustrates ongoing data collection monitor 500 for an ongoing data collection. In one or more embodiments, the anomaly detection system 106 generates the ongoing data collection monitor 500 utilizing a time series model 406. As shown in FIG. 5, the ongoing data collection monitor includes predicted signals 502 and an expected range 504 for the predicted signals 502.

As shown in FIG. 5, the anomaly detection system 106 continuously monitors the ongoing data collection over time. When the ongoing data collection falls outside the expected range 504, the anomaly detection system 106 identifies the anomaly candidate 506. Accordingly, the anomaly detection system 106 can identify the anomaly candidate 506 in real-time.

In addition, or in the alternative, the anomaly detection system 106 tracks the ongoing data collection in a time series batch going back a predetermined amount of time. For example, the anomaly detection system 106 can process data from the ongoing data collection with a time series batch of the previous seven days, a time series batch of the previous 30 days, a time series batch of the previous 90 days, or another time series batch.

The anomaly detection system 106 can utilize an algorithm corresponding to a data pattern to identify anomaly candidates for a variety of types of ongoing data collection. In one or more embodiments, the anomaly detection system 106 analyzes an ongoing data collection including data indicating a count, such as a rate or number of responses, traffic to a website, etc. Additionally, the anomaly detection system 106 can analyze an ongoing data collection for data indicating demographic information corresponding to users, data indicating a type of traffic, data indicating a category or score corresponding to user responses, and a variety of other characteristics of user interactions. Further, as mentioned above, the anomaly detection system 106 can utilize multiple algorithms to monitor multiple data signals within an ongoing data collection.

In one or more embodiments, the anomaly detection system 106 determines that a data point from the ongoing data collection qualifies as the anomaly candidate 506 utilizing an anomaly threshold. To illustrate, in some embodiments, the anomaly detection system 106 utilizes the algorithm corresponding to the data pattern to identify a probability that the data point is an anomaly candidate. Accordingly, the anomaly detection system 106 can compare the probability that the data point is an anomaly candidate to the anomaly threshold. In one or more embodiments, the anomaly detection system 106 can utilize an anomaly threshold customized based on user input. Additionally, similar to the discussion above with regard to FIG. 2, the anomaly detection system 106 can modify the anomaly threshold based on user interaction with anomaly notifications. If the probability that the data point is an anomaly candidate satisfies the anomaly threshold, the anomaly detection system 106 can mark the data point as an anomaly candidate (e.g., the anomaly candidate 506) and provide the anomaly candidate to an anomaly filter for validation.

As mentioned above, in one or more embodiments, the anomaly detection system 106 generates and/or identifies algorithms corresponding to data patterns by tuning one or more kernel parameters. For example, the anomaly detection system 106 can identify an algorithm corresponding to a data pattern by tuning kernel parameters of a Gaussian process regression. FIG. 6 illustrates an overview of a process of generating tuned algorithms corresponding to data patterns.

Figure 6:
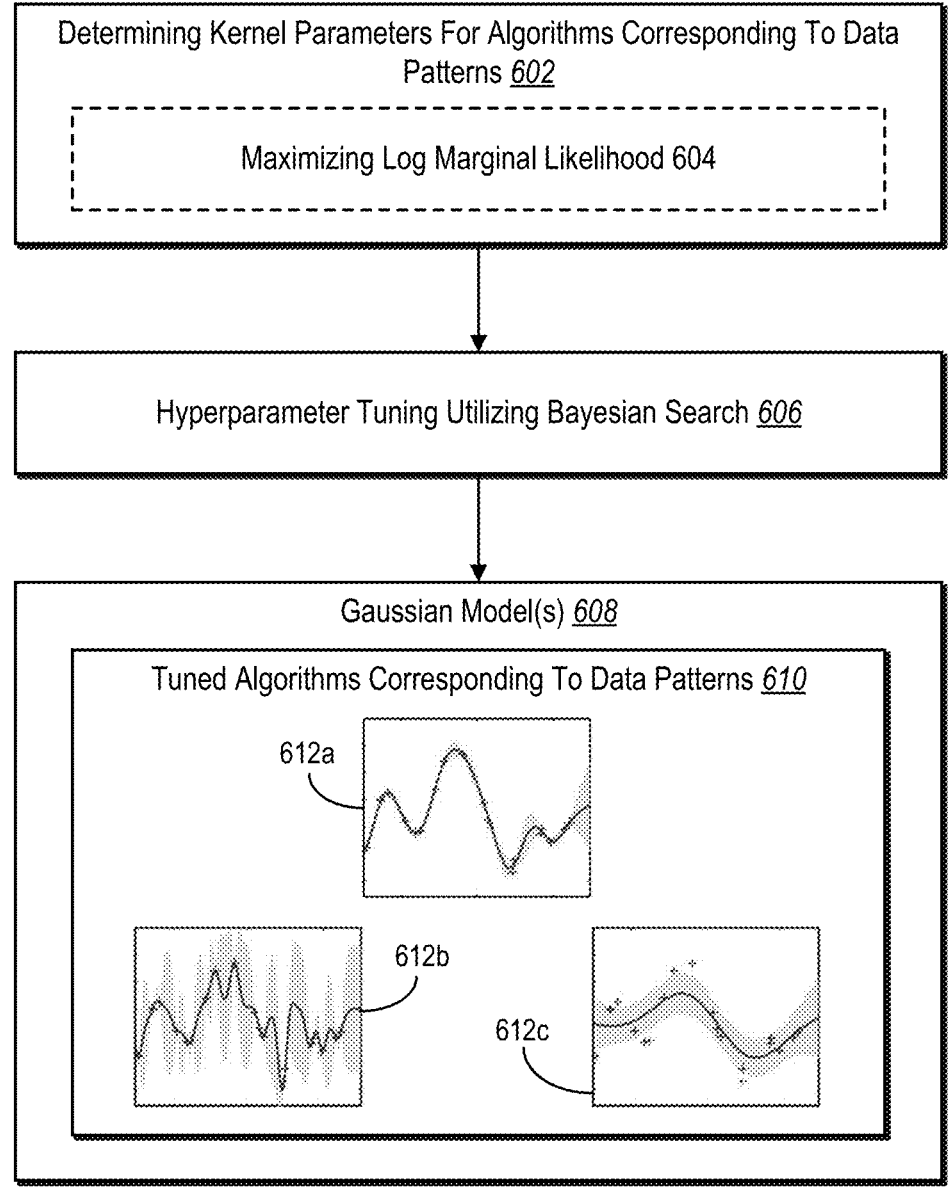
FIG. 6 illustrates an example process for generating a time series model in accordance with one or more embodiments.

As shown in FIG. 6, in one or more embodiments, the anomaly detection system 106 performs an act 602 of determining kernel parameters corresponding to data patterns. In one or more embodiments, the anomaly detection system 106 determines kernel parameters for a Gaussian Process function including a mean function and a covariance or kernel function, as shown below by Formula 1.

$$f(x) \sim GP(m(x), k(x, x')) \tag{1}$$

In one or more embodiments, the kernel function encodes assumptions and domain knowledge about the modeled functions. To illustrate, the anomaly detection system 106 can utilize Gaussian Processes including a squared exponential kernel and/or a periodic kernel. Further, the anomaly detection system 106 can combine kernels via multiplication and addition.

In one or more embodiments, the anomaly detection system 106 utilizes a squared exponential kernel as shown in Formula 2, where $\ell$ represents the lengthscale, which determines the length of variance within the function, and where $\sigma^2$ represents the output variance, which determines the average distance of the function from the mean.

$$k_{SE}(x, x^1) = \sigma^2 \exp\left(-\frac{(x - x')}{2\ell^2}\right) \tag{2}$$

Further, in some embodiments, the anomaly detection system 106 utilizes a periodic kernel as shown in Formula 3, where p represents the period, which determines the distance between repetitions of the function, where $\ell$ represents the lengthscale, which determines the length of variance within the function, and where $\sigma^2$ represents the output variance, which determines the average distance of the function from the mean.

$$k_{Per}(x, x') = \sigma^2 \exp\left(-\frac{2\sin^2(\pi |x - x'|/p)}{\ell^2}\right) \tag{3}$$

More specifically, in one or more embodiments, the act 602 includes an act 604 of maximizing a log marginal likelihood. To illustrate, the anomaly detection system 106 can maximize the probability of a model by a log marginal likelihood utilizing Formula 4.

$$\log p(y \mid X, \theta) = -\frac{1}{2} y^\top K_y^{-1} y - \frac{1}{2} \log |K_y| - \frac{n}{2} \log 2\pi \tag{4}$$

Formula 4 includes a data fit term, a complexity penalty, and a normalization constant to maximize the log marginal likelihood. Accordingly, the Formula 4 automatically incorporates a trade-off between model fit and model complexity. Further, in one or more embodiments, the anomaly detection system 106 can optimize kernel parameters via gradient-based optimizers. For example, the anomaly detection system 106 can utilize a limited-memory Broyden-Fletcher-Goldfarb-Shano algorithm (L-BFGS).

In one or more embodiments, the anomaly detection system 106 utilizes a Gaussian Process model that corrects for bias, is linearly constrained, and includes a radial bias function. Further, if the anomaly detection system 106 detects periodicity via an autoperiod method including a periodogram and autocorrelation, the anomaly detection system 106 can add a periodic kernel with a fixed period. Further, in one or more embodiments, the anomaly detection system 106 utilizes a Gaussian Process model including a Homoscedastic Gaussian noise model.

Further, as shown in FIG. 6, in one or more embodiments, the anomaly detection system 106 performs an act 606 of hyperparameter tuning utilizing Bayesian search. To illustrate, in one or more embodiments, the anomaly detection system 106 utilizes Bayesian search to solve hyperparameter tuning similar to a regression problem. More specifically, given a set of input features (e.g., the hyperparameters), the anomaly detection system 106 utilizes hyperparameter tuning to optimize a model for a chosen metric. Further, to solve the regression problem, hyperparameter tuning makes predictions as to which hyperparameters are most likely be most accurate. Thus, the anomaly detection system 106 can train the algorithm by testing these predictions. Upon testing a first set of hyperparameter predictions, Bayesian hyperparameter search uses regression to choose the next set of hyperparameter predictions to test. Accordingly, the anomaly detection system 106 can utilize Bayesian hyperparameter search to improve the accuracy and efficiency of algorithms corresponding to data patterns.

Further, in one or more embodiments, the anomaly detection system 106 utilizes a Bayesian Optimization Oracle to perform Bayesian search. To illustrate, the Bayesian Optimization Oracle utilizes Bayesian optimization for an underlying Gaussian process model. In one or more embodiments, the Bayesian Optimization Oracle includes an acquisition function that is upper confidence bound.

As shown in FIG. 6, in one or more embodiments and upon completing the acts 602 and 606, the anomaly detection system 106 can generate Gaussian model(s) 608 including tuned algorithms corresponding to data patterns 610. For example, the anomaly detection system 106 can generate tuned algorithms corresponding to data patterns 612a-612c. To illustrate, the anomaly detection system 106 generates the tuned algorithm corresponding to the data pattern 612a from a Gaussian progression with hyperparameters ($\ell$, $\sigma_f$, $\sigma_n$)= (1, 1, 0.1). Using Gaussian process prediction with these hyper parameters, the anomaly detection system 106 obtains a 95% confidence region for the for the tuned algorithm corresponding to the data pattern 612a.

In another example, the anomaly detection system 106 generates the tuned algorithm corresponding to the data pattern 612b from a Gaussian progression with hyperparameters ($\ell$, $\sigma_f$, $\sigma_n$)=(0.3, 1.08, 0.00005). Additionally, in a third example, the anomaly detection system 106 generates the tuned algorithm corresponding to the data pattern 612c from a Gaussian progression with hyperparameters ($\ell$, $\sigma_f$, $\sigma_n$)= (3.0, 1.16, 0.89). Further, the anomaly detection system 106 also determines a 95% confidence region for the tuned algorithms corresponding to data patterns 612*b*-612*c*. However, it will be appreciated that in one or more embodiments, the anomaly detection system 106 can utilize a variety of confidence regions, including 99%, 90%, etc.

Upon generating an anomaly candidate utilizing an algorithm corresponding to a data pattern for an ongoing data collection, the anomaly detection system 106 can pass the anomaly candidate through an anomaly filter. More specifically, in one or more embodiments, the anomaly detection system 106 validates anomaly candidates utilizing an anomaly validation model to sort anomaly candidates into true positives and false positives. FIG. 7 illustrates an overview of a process for applying an example anomaly validation model. As shown in FIG. 7, in one or more embodiments, the anomaly detection system 106 provides an anomaly candidate 702 to an anomaly validation model 704. In some embodiments, the anomaly validation model 704 is a multi-variate anomaly filter that validates anomaly candidates by determining that the candidate has a statistically significant difference from the expected value. As also shown in FIG. 7, the anomaly validation model 704 can validate this statistically significant difference utilizing one or more of a spam filter 706, an anomaly threshold 708, a model fit assessment 710, and/or a user-specific filter 712.

In one or more embodiments, the spam filter 706 implements one or more notification thresholds. To illustrate, the anomaly detection system 106 can determine a maximum frequency with which to send notifications to users. In one or more embodiments, the anomaly detection system 106 utilizes various notification thresholds corresponding to particular anomaly types, notification types, ongoing data collections, data signals, etc. For example, in one or more embodiments, the anomaly detection system 106 implements notification thresholds for particular time periods, such as every one day, every ten days, every thirty days, etc.

Accordingly, the anomaly detection system 106 can utilize the spam filter 706 to determine whether the anomaly candidate 702 satisfies various notification thresholds, and accordingly, whether the anomaly candidate satisfies criteria for anomaly notification timing. Thus, the anomaly detection system 106 can prevent sending unduly repetitive anomaly notifications. In addition, in one or more embodiments, the anomaly detection system 106 utilizes the spam filter 706 in conjunction with one or more other scores or probabilities that the anomaly validation model 704 generates. To illustrate, the spam filter 706 can make exceptions based on one or more probabilities or notification score exceeding an exception threshold.

Additionally, as shown in FIG. 7, the anomaly validation model can assess the anomaly threshold 708. In one or more embodiments, the anomaly detection system 106 utilizes the anomaly validation model 704 to identify and evaluate an anomaly threshold associated with the anomaly candidate 702. To illustrate, the anomaly detection system 106 can identify an anomaly threshold for the algorithm associated with the data pattern (e.g., the time series model) used to identify the anomaly candidate 702.

In some embodiments, the anomaly detection system 106 can determine whether the anomaly threshold 708 is appropriately sensitive. In one or more embodiments, the anomaly detection system 106 utilizes historical user data, data from the ongoing data collection, and/or other associated information to evaluate the sensitivity of the anomaly threshold. In some embodiments, the anomaly detection system 106 validates the anomaly candidate 702 if the anomaly threshold is within a sensitivity range based on the data associated with the anomaly candidate. In the alternative, if the anomaly threshold 708 associated with the anomaly candidate 702 is too sensitive, the anomaly detection system 106 can identify the anomaly candidate 702 as a false positive.

As also shown in FIG. 7, the anomaly validation model 704 can include a model fit assessment 710. In one or more embodiments, the anomaly detection system 106 utilizes the model fit assessment 710 to reevaluate the data pattern categorization for the ongoing data collection corresponding to the anomaly candidate 702. In some embodiments, over time, an ongoing data collection can undergo changes to its pattern(s) and necessitate recategorization. Accordingly, the anomaly detection system 106 can utilize the model fit assessment 710 to check the fit of the ongoing data collection overall to the currently categorized data pattern (e.g., the categorized time series classification).

In one or more embodiments, the anomaly detection system 106 can perform the model fit assessment 710 utilizing a variety of algorithms and/or metrics. To illustrate, the anomaly detection system 106 can evaluate linear fit and/or logistic fit of the data pattern to the ongoing data collection. For example, the anomaly detection system 106 can utilize Ordinary Least Squares regression, R-squared values, an overall fit test, a Root Mean Square Error, a combination of Sum of Squares Total and/or Sum of Squares Error, residuals, and/or a variety of other model fit metrics, or a combination thereof.

As also shown in FIG. 7, the anomaly validation model 704 can also include a user-specific filter 712. In one or more embodiments, the anomaly detection system 106 can implement one or more user settings and/or specific user feedback on anomaly notifications. For example, the anomaly detection system 106 can implement a user setting requesting no anomaly notifications for particular types of anomalies. Thus, the anomaly validation model 704 can automatically identify any anomaly candidates of that type as a false positive. In another example, the anomaly detection system 106 can receive negative user feedback corresponding to anomaly notifications showing negative sentiment for a particular type of survey question. Based on this feedback, the anomaly detection system 106 can determine to identify future anomaly candidates showing negative sentiment for the particular type of survey question as false positives.

Additionally, in one or more embodiments, the anomaly detection system 106 can provide the anomaly validation model 704 with additional information, including from third-party systems. Accordingly, the anomaly detection system 106 can utilize the anomaly validation model 704 to account for one or more additional factors for ongoing data streams. For example, the anomaly validation model 704 can account for holidays, current events, and other universal factors. Accordingly, the anomaly detection system 106 can utilize the anomaly validation model 704 to filter out anomalies that are accounted for by known factors.

Thus, as shown in FIG. 7, the anomaly detection system 106 can utilize the anomaly validation model 704 to categorize anomaly candidates into true positives 714 and false positives 716. As mentioned, the anomaly validation model 704 can utilize any combination of the spam filter 706, the anomaly threshold 708, the model fit assessment 710, and/or the user-specific filter 712. In one or more embodiments, the anomaly detection system 106 requires satisfaction of each step within the anomaly validation model 704 in order to classify the anomaly candidate 702 within the true positives 714.

As mentioned above, in one or more embodiments, the anomaly validation model 704 is multi-variate. To illustrate, in some embodiments, the anomaly validation model 704 utilizes a combination of scores from the spam filter 706, the anomaly threshold 708, the model fit assessment 710, and/or the user-specific filter 712 to classify the anomaly candidate 702 within the true positives 714 or the false positives 716. More specifically, in one or more embodiments, the anomaly validation model derives a Cartesian product of values from one or more of the spam filter 706, the anomaly threshold 708, the model fit assessment 710, and/or the user-specific filter 712. Further, as mentioned above, the anomaly validation model 704 can perform this multi-variate calculation more efficiently, utilizing less time and fewer computing resources than conventional systems.

Figure 8:
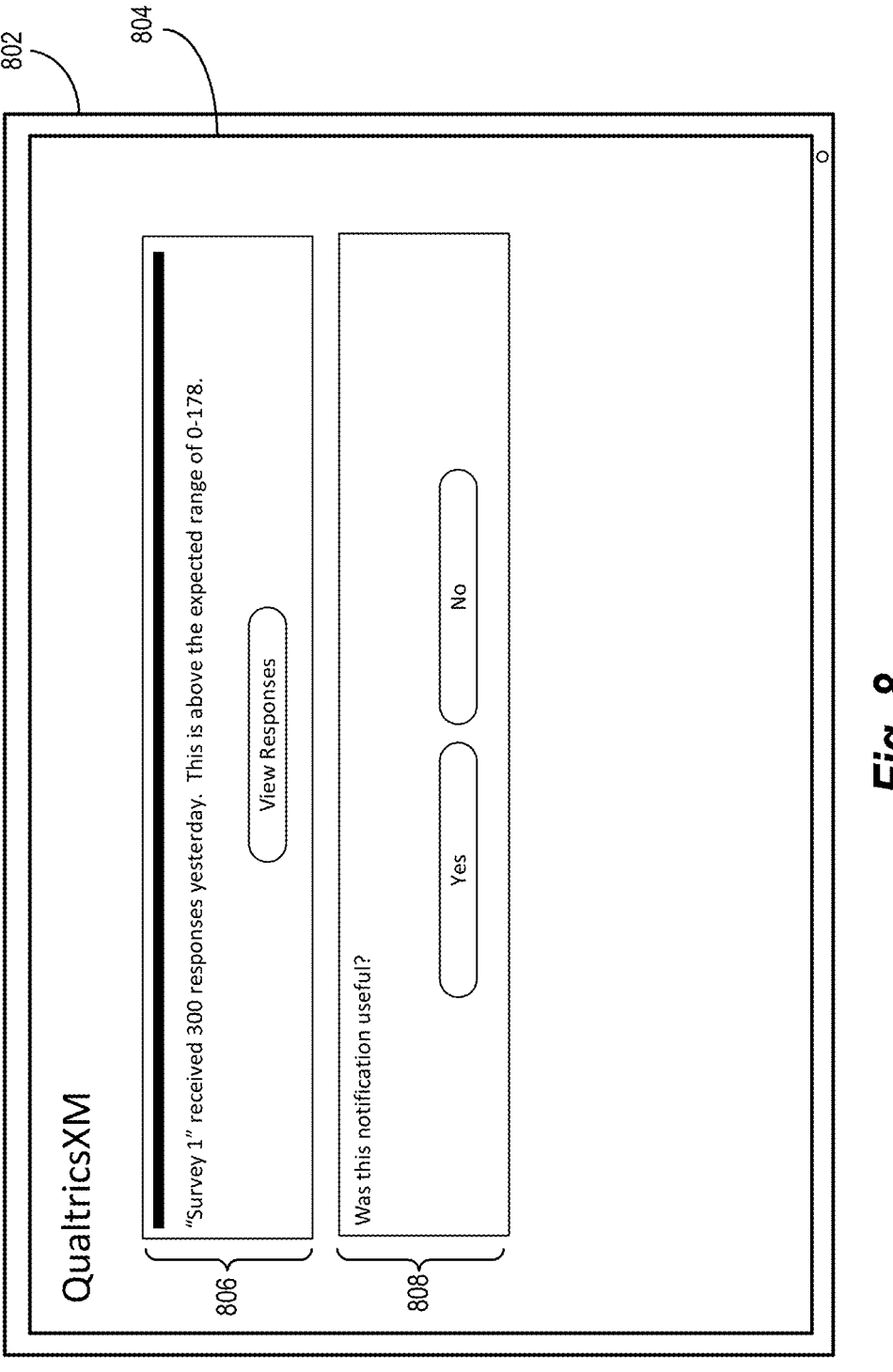
FIG. 8 illustrates an example anomaly notification in a data report graphical user interface in accordance with one or more embodiments.

Upon validating an anomaly candidate as a true positive, the anomaly detection system 106 can generate an anomaly notification. FIG. 8 illustrates an example anomaly notification in accordance with one or more embodiments. More specifically, FIG. 8 illustrates a computing device 802 displaying a graphical user interface 804, which includes an anomaly notification 806 and an anomaly notification feedback prompt 808.

As shown in FIG. 8, the anomaly detection system 106 generates the anomaly notification 806 including the text "'Survey 1' received 300 responses yesterday. This is above the expected range of 0-178." In one or more embodiments, the anomaly detection system 106 can generate the anomaly notification 806 to include a variety of information about the anomaly and corresponding ongoing data collections or data signals. For example, the anomaly detection system 106 can generate the anomaly notification 806 to include a name of the ongoing data collection and/or data signals, a time or time frame for the anomaly, an expected value or expected range corresponding to the anomaly, a certainty score or probability corresponding to the anomaly, historical anomalies related to the anomaly notification, or other information corresponding to the anomaly.

Further, as shown in FIG. 8, the anomaly notification 806 includes an option to "View Responses" related to the anomaly notification 806. In one or more embodiments, the anomaly detection system 106 can generate the anomaly notification 806 to include a variety of options to view additional information corresponding to the anomaly. For example, the anomaly detection system 106 can generate the anomaly notification 806 including a link to a data report corresponding to the ongoing data collection and/or the anomaly.

In one or more embodiments, upon validating an anomaly, the anomaly detection system 106 determines an explanation corresponding to the anomaly. To illustrate, the anomaly detection system 106 can utilize data corresponding to the anomaly to identify topics, sentiment, and/or other information corresponding to the anomaly. In one or more embodiments, the anomaly detection system 106 analyzes user actions implicated by the anomaly. For example, in a survey continuous data collection, the anomaly detection system 106 analyzes survey responses received in the time frame during which the anomaly occurred.

In one or more embodiments, the anomaly detection system 106 analyzes user responses, including free form responses, to identify topics corresponding to the anomaly. For example, the anomaly detection system 106 analyzes user comments, user navigation, and/or user survey responses. Thus, in one or more embodiments, the anomaly detection system 106 can rank the importance of text topics corresponding to the anomaly. In some embodiments, the anomaly detection system 106 determines an importance score based on a frequency and sentiment corresponding to a text topic. In one or more embodiments, the anomaly detection system 106 can include important text topics in the anomaly notification 806 based on the important text topics satisfying a minimum importance score.

In one or more embodiments, the anomaly detection system 106 generates a set of user responses for presentation in the anomaly notification 806. In some embodiments, the anomaly detection system 106 can rank responses based on inclusion of important text topics. Further, in one or more embodiments, the anomaly detection system 106 can ensure that each text topic with an importance score above an importance threshold includes at least one related user response.

Further, in one or more embodiments, the anomaly detection system 106 can utilize the ongoing data collection to predict important topics for the future. To illustrate, the anomaly detection system 106 can input current important topics and current data patterns for an ongoing data collection into a topic prediction model to project future topics based on current trends. To illustrate, the topic prediction model can extrapolate current trends to determine important topics for a future time period.

In one or more embodiments, the anomaly detection system 106 also analyzes other types of user response that are not textual in nature. For example, the anomaly detection system 106 can analyze user responses that are multiple choice, ratings, scales, etc. The anomaly detection system 106 can also analyze these types of responses to determine a reason driving an anomaly. For example, in a survey implementation, the anomaly detection system 106 can determine that ratings for customer service have declined dramatically immediately preceding a decline in responses. Accordingly, the anomaly detection system 106 can generate the anomaly notification 806 including the decline in customer service ratings with a short explanation of the decline.

In some embodiments, the anomaly detection system 106 utilizes a machine learning pipeline to automatically detect important topics for an ongoing data stream, based on both text-based and numerical user responses. In one or more embodiments, the machine learning pipeline includes one or more modules that detect topic sentiment. Accordingly, in some embodiments, the anomaly detection system 106 utilizes this topic machine learning pipeline to automatically generate important topics and corresponding explanations for anomalies. In one or more embodiments, the anomaly detection system 106 can utilize unsupervised and/or semi-supervised machine learning.

For example, a survey includes multiple choice questions and free form questions. In response to detecting an anomaly for the ongoing data collection of survey responses for this survey, the anomaly detection system 106 can collect survey responses during the time period corresponding to the anomaly. The anomaly detection system 106 then inputs the data into a topic machine learning pipeline. In one or more embodiments, the topic machine learning pipeline generates unstructured data based on the survey responses. Further, the topic machine learning pipeline utilizes the unstructured data to determine important text topics for the survey responses during the relevant period. To illustrate, in one or more embodiments the topic machine learning pipeline utilizes super fide machine learning based on a library of text topics and corresponding text. In some embodiments, the topic machine learning pipeline identifies keywords and classifies similar keywords together. In some embodiments, the identification of keywords is semi-supervised based on incorporation of an existing library of text topics.

Additionally, in one or more embodiments, the anomaly detection system 106 can utilize the topic machine learning pipeline to compare responses over two different time periods. Accordingly, the topic machine learning pipeline can identify important topics during a time period associated with an anomaly by comparing it to a time period not associated with an anomaly. To illustrate, the anomaly detection system 106 can utilize the topic machine learning pipeline to determine topics that were more important during a time associated with an anomaly.

Further, the anomaly detection system 106 can take the identified important topics and attach representative examples from the survey responses. Accordingly, the anomaly detection system 106 can provide both the important topics and examples within the anomaly notification 806. More specifically, in one or more embodiments, the anomaly detection system 106 provides the sample responses under a heading titled with the determined important text topic.

As also shown in FIG. 8, the anomaly detection system 106 generates the anomaly notification feedback prompt 808. As mentioned above with regard to FIG. 2, the anomaly detection system 106 can collect feedback on anomaly notifications and utilize the feedback to modify one or more of the time series classification model, the algorithm associated with the data pattern, and/or the anomaly validation model associated with the anomaly. More specifically, in response to receiving user interaction at the anomaly notification feedback prompt 808, the anomaly detection system 106 can utilize the feedback to modify one or more parameters of these models or algorithms.

Figure 9:
FIG. 9 illustrates a flowchart of a series of acts for identifying and validating an anomaly in an ongoing data collection in accordance with one or more embodiments.
Figure 9:
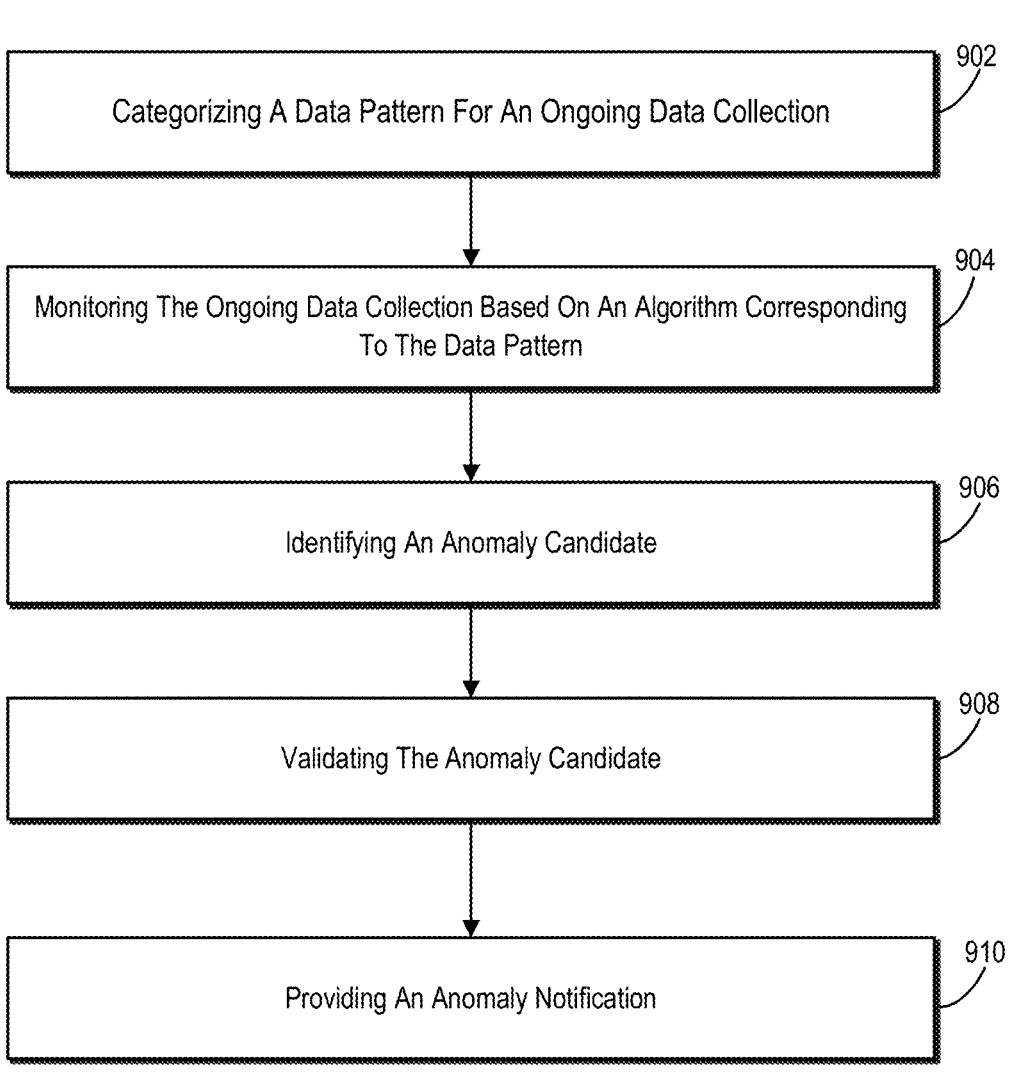

FIGS. 1-8, the corresponding text, and the examples provide a number of different methods, systems, devices, and non-transitory computer-readable media of the anomaly detection system. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for detecting and validating anomalies from an ongoing data collection in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 for categorizing a data pattern for an ongoing data collection. In particular, the act 902 can include utilizing a time series classification model to categorize a data pattern for an ongoing data collection. Specifically, the act 902 can include wherein the ongoing data collection comprises a plurality of data signals, further comprising categorizing a plurality of data patterns for the plurality of data signals, and utilizing a plurality of algorithms corresponding to the plurality of data signals. Additionally, the act 902 can include wherein the time series classification model comprises a Gaussian process regression and the data pattern comprises one or more kernel functions.

As shown in FIG. 9, the series of acts 900 includes an act 904 for monitoring the ongoing data collection based on an algorithm corresponding to the data pattern. In particular, the act 904 can include based on the categorized data pattern, monitoring the ongoing data collection utilizing an algorithm corresponding to the data pattern. Additionally, the act 904 can include wherein the algorithm comprises a normal range of values for the ongoing data collection.

As shown in FIG. 9, the series of acts 900 includes an act 906 for identifying an anomaly candidate. In particular, the act 906 can include utilizing the algorithm corresponding to the data pattern to identify an anomaly candidate from the ongoing data collection. Specifically, the act 906 can include comparing a most recent data point of the ongoing data collection to the algorithm corresponding to the data pattern to determine a likelihood that the most recent data point follows the data pattern, and identifying the anomaly candidate by determining that the likelihood satisfies an anomaly threshold. Further, in one or more embodiments, the act 906 includes generating kernel parameters from a Gaussian Process by maximizing a log marginal likelihood, wherein the Gaussian process regression comprises a data-fit term, a complexity penalty, and a normalization constant.

As shown in FIG. 9, the series of acts 900 includes an act 908 for validating the anomaly candidate. In particular, the act 908 can include validating the anomaly candidate as an anomaly by passing the anomaly candidate through an anomaly filter. Specifically, the act 908 can include wherein applying the anomaly filter further comprises determining an anomaly ratio for the ongoing data collection utilizing the anomaly candidate, and comparing the anomaly ratio to an anomaly ratio threshold.

As shown in FIG. 9, the series of acts 900 includes an act 910 for providing an anomaly notification. In particular, the act 910 can include in response to validating the anomaly candidate, providing an anomaly notification comprising information about the anomaly via a data report graphical user interface. Specifically, the act 910 can include receiving feedback via the data report graphical user interface corresponding to the anomaly notification, and updating, based on the feedback, one of the time series classification model, the algorithm corresponding to the data pattern, or the anomaly filter. Additionally, in one or more embodiments, the act 910 includes generating a customized anomaly filter for a user account based on user feedback.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
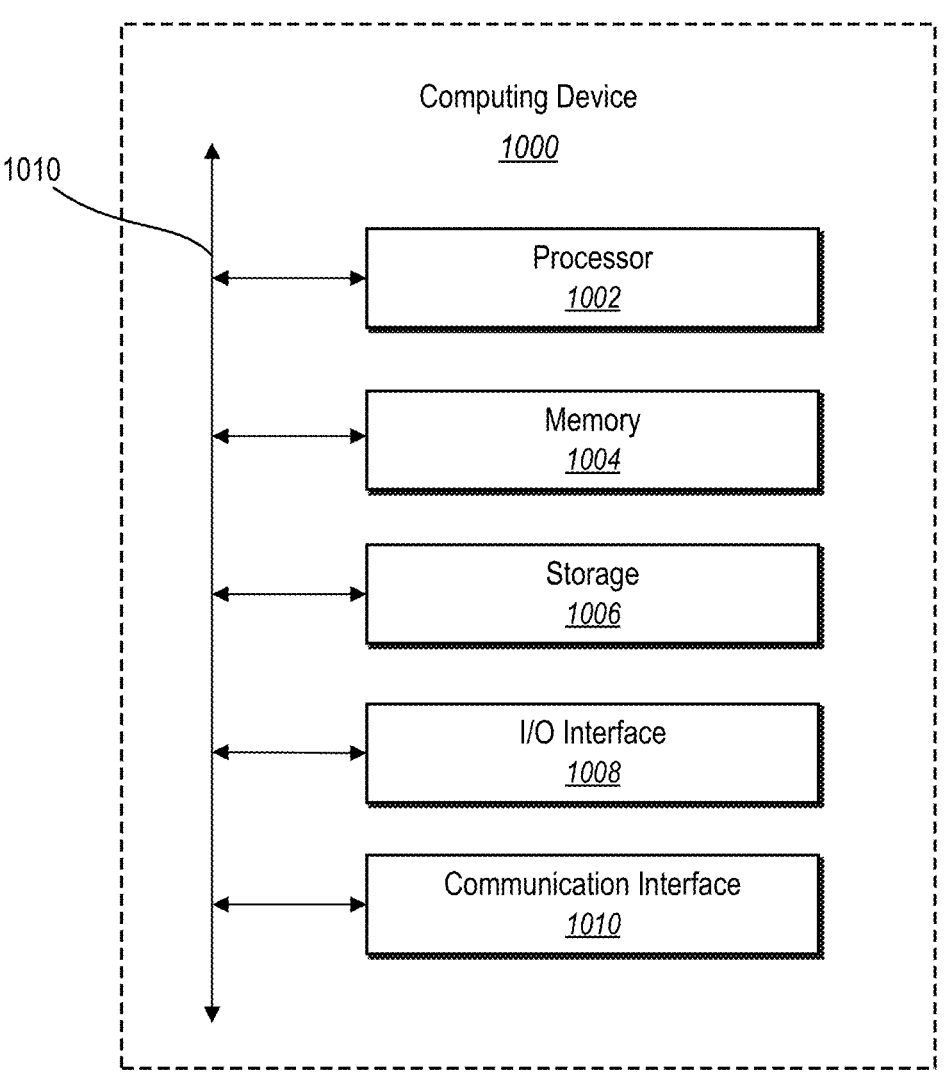
FIG. 10 illustrates a block diagram of an example computing device for implementing one or more embodiments of the present disclosure.

FIG. 10 illustrates a block diagram of computing device 1000 that can be configured to perform one or more of the processes described above. One will appreciate that one or more computing devices such as the computing device 1000 can implement the various devices of the environment of FIG. 1. As shown by FIG. 10, the computing device 1000 can comprise a processor 1002, a memory 1004, a storage device 1006, an I/O interface 1008, and a communication interface 1010, which can be communicatively coupled by way of a communication interface 1010. While a computing device 1000 is shown in FIG. 10, the components illustrated in FIG. 10 are not intended to be limiting. Additional or alternative components can be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions, the processor 1002 can retrieve (or fetch) the instructions from an internal register, an internal cache, the memory 1004, or the storage device 1006 and decode and execute them. In one or more embodiments, the processor 1002 can include one or more internal caches for data, instructions, or addresses. As an example, and not by way of limitation, the processor 1002 can include one or more instruction caches, one or more data caches, and one or more translation lookaside buffers (TLBs). Instructions in the instruction caches can be copies of instructions in the memory 1004 or the storage device 1006.

The memory 1004 can be used for storing data, metadata, and programs for execution by the processor(s). The memory 1004 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 can be internal or distributed memory.

The storage device 1006 includes storage for storing data or instructions. As an example, and not by way of limitation, storage device 1006 can comprise a non-transitory storage medium described above. The storage device 1006 can include a hard disk drive (HDD), a floppy disk drive, flash memory, an optical disc, a magneto-optical disc, magnetic tape, or a Universal Serial Bus (USB) drive or a combination of two or more of these. The storage device 1006 can include removable or non-removable (or fixed) media, where appropriate. The storage device 1006 can be internal or external to the computing device 1000. In one or more embodiments, the storage device 1006 is non-volatile, solid-state memory. In other embodiments, the storage device 1006 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 can include a mouse, a keypad or a keyboard, a touch screen, a camera, an optical scanner, network interface, modem, other known I/O devices or a combination of such I/O interfaces. The I/O interface 1008 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data can be representative of one or more graphical user interfaces and/or any other graphical content as can serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1010 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 1010 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication interface 1010 can include hardware, software, or both that couples components of the computing device 1000 to each other. As an example and not by way of limitation, the communication interface 1010 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
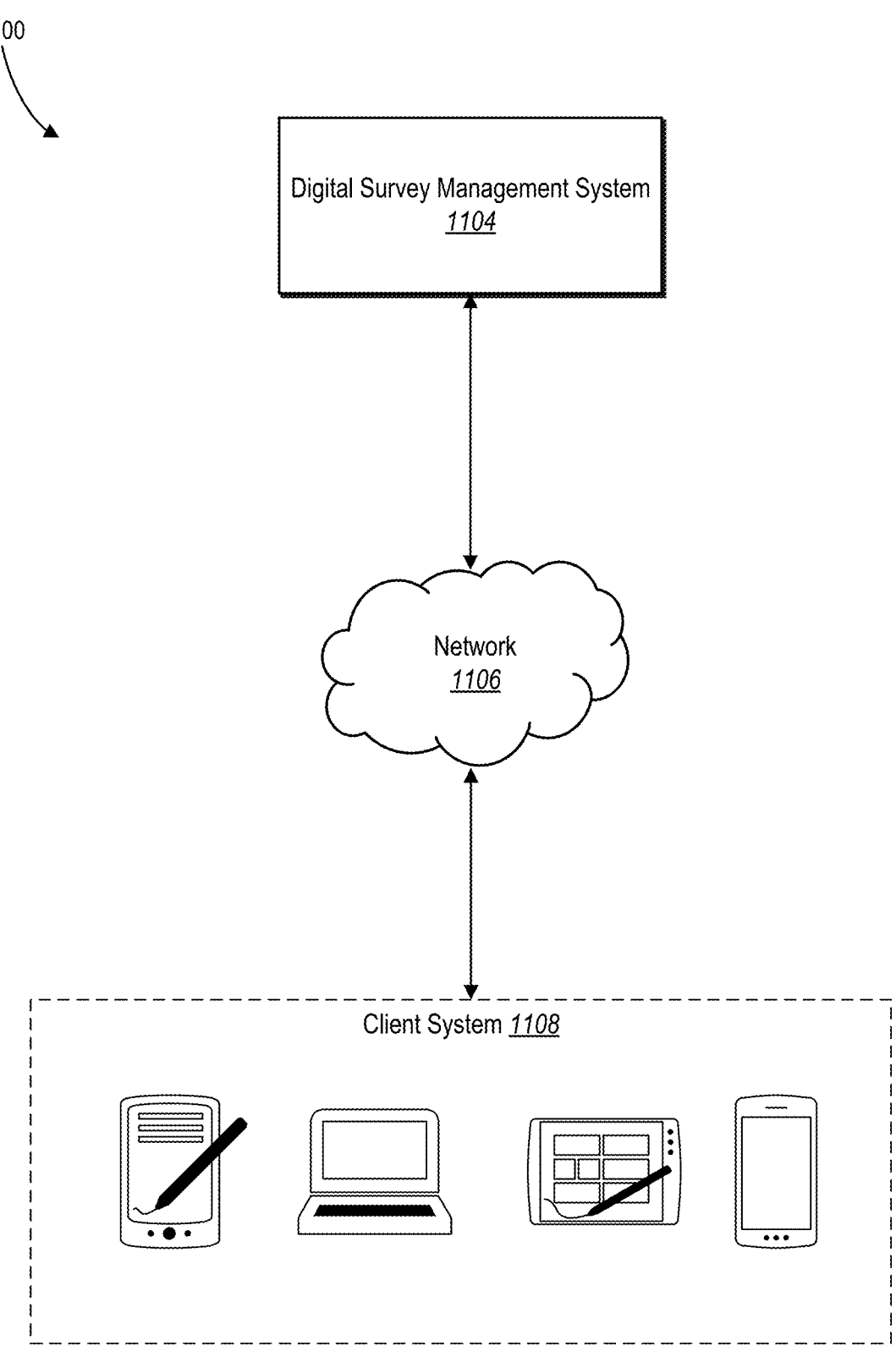
FIG. 11 illustrates a network environment of a digital survey system in accordance with one or more embodiments.

FIG. 11 illustrates an example network environment 1100. Network environment 1100 includes a client system 1108, and a digital content survey system 1104 connected to each other by a network 1106. Although FIG. 11 illustrates a particular arrangement of client system 1108, digital content survey system 1104, and network 1106, this disclosure contemplates any suitable arrangement of client system 1108, digital content survey system 1104, and network 1106. As an example and not by way of limitation, two or more of client system 1108, and digital content survey system 1104 can be connected to each other directly, bypassing network 1106. As another example, two or more of client system 1108 and digital content survey system 1104 can be physically or logically co-located with each other in whole, or in part. Moreover, although FIG. 11 illustrates a particular number of client systems 1108, digital content survey system 1104, and network 1106, this disclosure contemplates any suitable number of client systems 1108, digital content survey system 1104, and network 1106. As an example and not by way of limitation, network environment 1100 can include multiple client systems 1108, digital content survey system 1104, and network 1106.

This disclosure contemplates any suitable network 1106. As an example and not by way of limitation, one or more portions of network 1106 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1106 can include one or more networks.

Links can connect client system 1108, and digital content survey system 1104 to network 1106 or to each other. This disclosure contemplates any suitable links. In particular embodiments, one or more links include one or more wire-line (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links can differ in one or more respects from one or more second links.

In particular embodiments, client system 1108 can be an electronic device including hardware, software, or embedded logic components or a combination of two or more such components and capable of carrying out the appropriate functionalities implemented or supported by client system 1108. As an example and not by way of limitation, a client system 1108 can include any of the computing devices discussed above in relation to FIG. 11. A client system 1108 can enable a network user at client system 1108 to access network 1106. A client system 1108 can enable its user to communicate with other users at other client devices or systems.

In particular embodiments, client system 1108 can include a web browser, such as MICROSOFT EDGE, GOOGLE CHROME, or MOZILLA FIREFOX, and can have one or more add-ons, plug-ins, or other extensions, such as TOOL-BAR or YAHOO TOOLBAR. A user at client system 1108 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client system 1108 one or more Hyper Text Markup Language (HTML) files responsive to the HTTP request. Client system 1108 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, digital content survey system 1104 can include a variety of servers, sub-systems, programs, modules, logs, and data stores. In particular embodiments, digital content survey system 1104 can include one or more of the following: a web server, action logger, API-request server, relevance-and-ranking engine, content-object classifier, notification controller, action log, third-party-content-object-exposure log, inference module, authorization/ privacy server, search module, advertisement-targeting module, user-interface module, user-profile store, connection store, third-party content store, or location store. Digital content survey system 1104 can also include suitable components such as network interfaces, security mechanisms, load balancers, failover servers, management-and-network-operations consoles, other suitable components, or any suitable combination thereof.

In particular embodiments, digital content survey system 1104 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

utilizing a time series classification model to determine a time series classification corresponding to an ongoing data collection;

selecting, based on the time series classification corresponding to the ongoing data collection, a data pattern for the ongoing data collection;

determining a custom-fit algorithm for monitoring the ongoing data collection based on the data pattern for the ongoing data collection by automatically applying a tuning function to modify one or more parameters of the custom-fit algorithm relative to the data pattern for the ongoing data collection, wherein determining the custom-fit algorithm further comprises generating kernel parameters from a Gaussian process regression by maximizing a log marginal likelihood utilizing a data-fit term, a complexity penalty, and a normalization constant within the Gaussian process regression;

monitoring the ongoing data collection utilizing the custom-fit algorithm corresponding to the data pattern;

utilizing the custom-fit algorithm corresponding to the data pattern to identify an anomaly candidate from the ongoing data collection;

validating the anomaly candidate as an anomaly by passing the anomaly candidate through an anomaly filter; and in response to validating the anomaly candidate, providing an anomaly notification comprising information about the anomaly via a data report graphical user interface.

2. The method of claim 1, wherein the ongoing data collection comprises a plurality of data signals, further comprising:

categorizing a plurality of data patterns for the plurality of data signals; and utilizing a plurality of custom-fit algorithms corresponding to the plurality of data signals.

3. The method of claim 1, further comprising:

receiving feedback via the data report graphical user interface corresponding to the anomaly notification; and updating, based on the feedback, the custom-fit algorithm corresponding to the data pattern.

4. The method of claim 1, further comprising identifying the anomaly candidate by:

comparing a most recent data point of the ongoing data collection to the custom-fit algorithm corresponding to the data pattern to determine a likelihood that the most recent data point follows the data pattern;

generating an anomaly threshold based on received user input indicating a value for the anomaly threshold; and identifying the anomaly candidate by determining that the likelihood satisfies the anomaly threshold.

5. The method of claim 1, wherein the time series classification model comprises the Gaussian process regression and the data pattern comprises one or more kernel functions.

6. The method of claim 1, wherein the custom-fit algorithm comprises a normal range of values for the ongoing data collection.

7. The method of claim 1, wherein applying the anomaly filter further comprises:

determining an anomaly ratio for the ongoing data collection utilizing the anomaly candidate; and comparing the anomaly ratio to an anomaly ratio threshold.

8. The method of claim 1, further comprising generating a customized anomaly filter for a user account based on user feedback.

9. A system comprising:

at least one processor; and at least one non-transitory computer-readable storage medium storing instructions that, when executed by the at least one processor, cause the system to:

utilize a time series classification model to determine a time series classification corresponding to an ongoing data collection;

select, based on the time series classification corresponding to the ongoing data collection, a data pattern for the ongoing data collection;

determine a custom-fit algorithm for monitoring the ongoing data collection based on the data pattern for the ongoing data collection by automatically applying a tuning function to modify one or more parameters of the custom-fit algorithm relative to the data pattern for the ongoing data collection, wherein determining the custom-fit algorithm comprises generating kernel parameters from a Gaussian process regression by maximizing a log marginal likelihood utilizing a data-fit term, a complexity penalty, and a normalization constant within the Gaussian process regression;

monitor the ongoing data collection utilizing the custom-fit algorithm corresponding to the data pattern;

utilize the custom-fit algorithm corresponding to the data pattern to identify an anomaly candidate from the ongoing data collection;

validate the anomaly candidate as an anomaly by passing the anomaly candidate through an anomaly filter; and in response to validating the anomaly candidate, provide an anomaly notification comprising information about the anomaly via a data report graphical user interface.

10. The system of claim 9, further comprising instructions that, when executed by the at least one processor, cause the system to:

categorize a plurality of data patterns for a plurality of data signals; and utilize a plurality of custom-fit algorithms corresponding to the plurality of data signals.

11. The system of claim 9, further comprising instructions that, when executed by the at least one processor, cause the system to:

receive feedback via the data report graphical user interface corresponding to the anomaly notification; and update, based on the feedback, the custom-fit algorithm corresponding to the data pattern.

12. The system of claim 9, further comprising instructions that, when executed by the at least one processor, cause the system to identify the anomaly candidate by:

comparing a most recent data point of the ongoing data collection to the custom-fit algorithm corresponding to the data pattern to determine a likelihood that the most recent data point follows the data pattern; and identifying the anomaly candidate by determining that the likelihood satisfies an anomaly threshold.

13. A non-transitory computer-readable medium storing instructions that, when executed by at least one processor, cause a computer device to:

utilize a time series classification model to determine a time series classification corresponding to an ongoing data collection;

select, based on the time series classification corresponding to the ongoing data collection, a data pattern for the ongoing data collection;

determine a custom-fit algorithm for monitoring the ongoing data collection based on the data pattern for the ongoing data collection by automatically applying a tuning function to modify one or more parameters of the custom-fit algorithm relative to the data pattern for the ongoing data collection, wherein determining the custom-fit algorithm further comprises generating kernel parameters from a Gaussian process regression by maximizing a log marginal likelihood utilizing a data-fit term, a complexity penalty, and a normalization constant within the Gaussian process regression;

monitor the ongoing data collection utilizing the custom-fit algorithm corresponding to the data pattern;

utilize the custom-fit algorithm corresponding to the data pattern to identify an anomaly candidate from the ongoing data collection;

validate the anomaly candidate as an anomaly by passing the anomaly candidate through an anomaly filter; and in response to validating the anomaly candidate, provide an anomaly notification comprising information about the anomaly via a data report graphical user interface.

14. The non-transitory computer-readable medium of claim 13, further comprising instructions that, when executed by the at least one processor, cause the computer device to:

categorize a plurality of data patterns for a plurality of data signals; and utilize a plurality of custom-fit algorithms corresponding to the plurality of data signals.

15. The non-transitory computer-readable medium of claim 13, further comprising instructions that, when executed by the at least one processor, cause the computer device to:

receive feedback via the data report graphical user interface corresponding to the anomaly notification; and update, based on the feedback, the custom-fit algorithm corresponding to the data pattern.

16. The non-transitory computer-readable medium of claim 13, further comprising instructions that, when executed by the at least one processor, cause the computer device to identify the anomaly candidate by:

comparing a most recent data point of the ongoing data collection to the custom-fit algorithm corresponding to the data pattern to determine a likelihood that the most recent data point follows the data pattern;

generating an anomaly threshold based on received user input indicating a value for the anomaly threshold; and identifying the anomaly candidate by determining that the likelihood satisfies the anomaly threshold.

17. The non-transitory computer-readable medium of claim 13, further comprising instructions that, when executed by the at least one processor, cause the computer device to apply the anomaly filter further by:

determining an anomaly ratio for the ongoing data collection utilizing the anomaly candidate; and comparing the anomaly ratio to an anomaly ratio threshold.

* * * * *